(12) United States Patent
Lim

(10) Patent No.: US 11,024,016 B2
(45) Date of Patent: Jun. 1, 2021

(54) IMAGE PROCESSING APPARATUS AND IMAGE PROCESSING METHOD THEREOF

(71) Applicant: SAMSUNG ELECTRONICS CO., LTD., Suwon-si (KR)

(72) Inventor: Hyungjun Lim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 91 days.

(21) Appl. No.: 16/551,987

(22) Filed: Aug. 27, 2019

(65) Prior Publication Data

US 2020/0320669 A1    Oct. 8, 2020

(30) Foreign Application Priority Data

Apr. 5, 2019    (KR) .................. 10-2019-0040076

(51) Int. Cl.
*G06T 5/00*    (2006.01)

(52) U.S. Cl.
CPC .............. *G06T 5/008* (2013.01); *G06T 5/003* (2013.01); *G06T 2207/20024* (2013.01); *G06T 2207/20172* (2013.01)

(58) Field of Classification Search
CPC ........... G06T 5/008; G06T 5/003; G06T 5/10; G06T 2207/20024; G06T 2207/20172; G06T 2207/20192; G06T 7/13
See application file for complete search history.

(56) References Cited

U.S. PATENT DOCUMENTS

| 4,433,438 A | 2/1984 | Couturier |
| 8,335,396 B2 | 12/2012 | Yamada et al. |
| 8,792,139 B2 | 7/2014 | Makino |
| 9,679,357 B2 | 6/2017 | Suzuki |
| 10,515,440 B2 | 12/2019 | Lim et al. |
| 2006/0279660 A1 | 12/2006 | Ali |
| 2008/0012858 A1 | 1/2008 | Matsumoto |
| 2009/0316024 A1 | 12/2009 | Noh |
| 2010/0239173 A1 | 9/2010 | Yamada et al. |
| 2012/0162675 A1 | 6/2012 | Makino |
| 2014/0093177 A1 | 4/2014 | Hayashi et al. |
| 2016/0155215 A1 | 6/2016 | Suzuki |
| 2019/0066274 A1 | 2/2019 | Lim et al. |

FOREIGN PATENT DOCUMENTS

| JP | 2004077927 A | 3/2004 |
| JP | 2008-17906 A | 1/2008 |
| JP | 2008004085 A | 1/2008 |
| JP | 2009-302761 A | 12/2009 |
| JP | 2010-226260 A | 10/2010 |

(Continued)

OTHER PUBLICATIONS

Communication dated Apr. 14, 2020 from the Japanese Patent Office in application No. 2019-181278.

(Continued)

*Primary Examiner* — John B Strege
(74) *Attorney, Agent, or Firm* — Sughrue Mion, PLLC

(57) ABSTRACT

An image processing apparatus filters an image and obtains a signal in a threshold range as a shadow. The image processing apparatus obtains boundary information by applying boundary detection filters associated with different directions. The shadow is applied, based on the boundary information, to a portion of the input image to provide an output image with improved sharpness.

20 Claims, 25 Drawing Sheets

(56) References Cited

FOREIGN PATENT DOCUMENTS

| | | |
|---|---|---|
| JP | 2012-142724 A | 7/2012 |
| JP | 2014-123247 A | 7/2014 |
| JP | 2015154415 A | 8/2015 |
| JP | 2016-103095 A | 6/2016 |
| JP | 5995704 B2 | 9/2016 |
| KR | 10-2011-0001425 A | 1/2011 |
| KR | 10-2011-0121261 A | 11/2011 |
| KR | 10-1870084 B1 | 6/2018 |
| KR | 10-2019-0023883 A | 3/2019 |
| WO | 2015053352 A1 | 4/2015 |

OTHER PUBLICATIONS

Communication dated Jul. 28, 2020, from the Japanese Patent Office in counterpart application No. 2019-181278.

Communication dated Nov. 5, 2019 issued by the Japanese Intellectual Property Office in counterpart Japanese Application No. 2019-181278.

Communication dated Nov. 6, 2019 issued by the European Intellectual Property Office in counterpart European Application No. 19194983.3.

Written Opinion dated Jan. 9, 2020 issued by the International Searching Authority in counterpart Application No. PCT/KR2019/011662 (PCT/ISA/237).

Bruna et al., "Adaptive directional sharpening with overshoot control", Proceedings of SPIE, vol. 6812, 681213, Mar. 3, 2008, 9 pages total, XP055634459.

Ramponi et al., "Nonlinear unsharp masking methods for image contrast enhancement", Journal of Electronic Imaging, vol. 5, Jul. 1996, pp. 353-366, 14 pages total, XP055634462.

Anonymous, "Sobel operator", Wikipedia, Feb. 2019, 5 pages total, XP055634261.

Archana et al., "Edge Detection Using the Sobel Compass Operator", 2016, pp. 98-101, 4 pages total, XP055634470.

Yoon et al., "Fast Dense Stereo Matching Using Adaptive Window in Hierarchical Framework", 2006, pp. 316-325, 10 pages total, XP019050850.

International Search Report dated Jan. 9, 2020 issued by the International Searching Authority in counterpart Application No. PCT/KR2019/011662 (PCT/ISA/210).

Communication dated Apr. 1, 2021 by the European Patent Office in corresponding European Application No. 19 194 983.3.

FIG. 3B

| 0 | 0 | 0 |
|---|---|---|
| -1 | 2 | -1 |
| 0 | 0 | 0 |

| 0 | -1 | 0 |
|---|---|---|
| -1 | 4 | -1 |
| 0 | -1 | 0 |

| -1 | -1 | -1 |
|---|---|---|
| -1 | 8 | -1 |
| -1 | -1 | -1 |

| 1 | -2 | 1 |
|---|---|---|
| -2 | 4 | -2 |
| 1 | -2 | 1 |

IMAGE PROCESSING APPARATUS AND IMAGE PROCESSING METHOD THEREOF

CROSS-REFERENCE TO RELATED APPLICATIONS

This application claims benefit of priority under 35 U.S.C. § 119 to Korean Patent Application No. 10-2019-0040076, filed on Apr. 5, 2019, in the Korean Intellectual Property Office, the disclosure of which is incorporated by reference herein in its entirety.

BACKGROUND

Field

The disclosure is related to enhancement processing for an input image.

Description of the Related Art

Development of electronic technology has led to development and distribution of various types of electronic devices. In particular, display devices used in various places, such as a home, an office, a public place, and the like, have been continuously developed in recent years.

Recently, there is an increasing demand for high resolution image service. Due to this demand, as the resolution of display devices increases, technologies for improving image detail are continuously developed. In particular, there is a need for development of a detail enhancement technique for sharpening the details lost in a compression process or a blur image in a process of enlarging an image.

SUMMARY

Embodiments may overcome the above disadvantages and other disadvantages not described above. Also, an embodiment is not required to overcome the disadvantages described above, and an embodiment may not overcome any of the problems described above.

The disclosure provides an image processing apparatus and an image processing method for accurately detecting a boundary of an object in an image and applying shadowing to the detected boundary, to enhance details of the image.

According to an embodiment, the disclosure relates to an image processing apparatus for enhancing a detail of an image by accurately detecting a boundary of an object in an image and applying shadowing to the detected boundary, and an image processing method thereof.

Embodiments provide an image processing apparatus comprising: one or more processors; and one or more memories storing program code. Execution of the program code by the one or more processors is configured to cause the image processing apparatus to: obtain, based on filtering of an input image, a shadow, the shadow is a signal in a threshold range; obtain boundary information by applying, to the input image, a plurality of boundary detection filters, each boundary detection filter of the plurality of boundary detection filters is associated with a different direction; and obtain an output image by applying the shadow to a region identified based on the boundary information.

In some embodiments of the image processing apparatus, the one or more processors are further configured to: filter by obtaining an output signal by filtering with a second-order differentiation filter, and obtain the shadow by clipping a positive signal or a negative signal from the output signal.

In some embodiments of the image processing apparatus, the shadow corresponds to at least one of: an inner boundary of a first object in the input image, the inner boundary includes a first pixel having a first pixel value that is less than a first threshold, or an outer boundary of a second object in the input image, the outer boundary includes a second pixel having a second pixel value that is greater than or equal to a second threshold, and the second threshold is greater than the first threshold.

In some embodiments of the image processing apparatus, the boundary information comprises position information and magnitude information, the one or more processors are further configured to identify the boundary region based on the position information, and the one or more processors are further configured to obtain the output image by: applying magnitude information corresponding to the boundary region to the shadow, and inserting the shadow to which the magnitude information is applied into the boundary region.

In some embodiments of the image processing apparatus, the one or more processors are further configured to filter with a second-order differentiation filter, and a first size of each of the plurality of boundary detection filters is greater than a second size of the second-order differentiation filter.

In some embodiments of the image processing apparatus, the input image includes a first pixel block, and the one or more processors are further configured to: obtain the boundary information by: obtaining a first plurality of filter output values by applying the plurality of boundary detection filters to the first pixel block, and obtaining first boundary information associated with the first pixel block based on a first value of the first plurality of filter output values.

In some embodiments of the image processing apparatus, the one or more processors are further configured to obtain the boundary information associated with the first pixel block based on: a magnitude of a smallest negative value of the first plurality of filter output values, or a maximum absolute value of the first plurality of filter output values.

In some embodiments of the image processing apparatus, the one or more processors are further configured to: obtain a weight by performing a normalization by applying a threshold to: i) the magnitude of the smallest negative value or ii) the maximum absolute value, and obtain the output image by applying the weight to the obtained shadow.

In some embodiments of the image processing apparatus, the one or more processors are further configured to determine, based on a characteristic of the boundary region, at least one of a number or a size of the plurality of boundary detection filters.

In some embodiments of the image processing apparatus, the plurality of boundary detection filters comprises a first filter in which a same filter coefficient is overlapped in a line unit in a first direction, a second filter in which a same filter coefficient is overlapped in a line unit in a second direction, a third filter in which a same filter coefficient is overlapped in a line unit in a third direction, and a fourth filter in which a same filter coefficient is overlapped in a line unit in a fourth direction.

In some embodiments of the image processing apparatus, based on a number of the plurality of boundary detection filters being N, a direction of an nth boundary detection filter is calculated as follows: the angle of nth boundary detection filter is equal to $180*(n-1)/N$.

In some embodiments of the image processing apparatus the image processing apparatus includes a display, and the one or more processors are further are configured to control the display to output the output image, and the output image is a 4K ultra high definition (UHD) image or an 8K UHD image.

Also provided herein is an image processing method. The image processing method comprising: filtering an input image; obtaining, based on filtering of an input image, a shadow, the shadow is a signal in a threshold range; obtaining boundary information by applying, to the input image, a plurality of boundary detection filters, each boundary detection filter of the plurality of boundary detection filters is associated with a different direction; identifying, based on the boundary information, a boundary region; and obtaining an output image by applying the shadow to a region identified based on the boundary information.

In some embodiments of the image processing method, the obtaining the shadow comprises obtaining an output signal by filtering with a second-order differentiation filter, and clipping a positive signal or a negative signal from the output signal.

In some embodiments of the image processing method, the shadow corresponds to at least one of: an inner boundary of a first object in the input image, the inner boundary includes a first pixel having a first pixel value that is less than a first threshold, or an outer boundary of a second object in the input image, the outer boundary includes a second pixel having a second pixel value that is greater than or equal to a second threshold, and the second threshold is greater than the first threshold.

In some embodiments of the image processing method, the boundary information comprises position information and magnitude information, the obtaining the output image comprises: identifying the boundary region based on the position information, applying magnitude information corresponding to the boundary region to the shadow, and inserting the shadow to which the magnitude information is applied into the boundary region.

In some embodiments of the image processing method, the obtaining the shadow comprises filtering with a second-order differentiation filter, and a first size of each of the plurality of boundary detection filters is greater than a second size of the second-order differentiation filter.

In some embodiments of the image processing method, the input image includes a first pixel block, and the obtaining the boundary information comprises: obtaining a first plurality of filter output values by applying the plurality of boundary detection filters to the first pixel block, and obtaining first boundary information associated with the first pixel block based on a first value of the first plurality of filter output values.

In some embodiments of the image processing method, the obtaining the boundary information comprises obtaining boundary information associated with the first pixel block based on: a magnitude of a smallest negative value of the first plurality of filter output values, or a maximum absolute value of the first plurality of filter output values.

Also provided herein is a non-transitory computer-readable recording medium storing computer instructions which allow an image processing apparatus to perform an operation when the computer instructions are executed by one or more processors of the image processing apparatus, the operation comprising: obtaining, based on filtering of an input image, a shadow, the shadow is a signal in a threshold range; obtaining boundary information by applying, to the input image, a plurality of boundary detection filters, each boundary detection filter of the plurality of boundary detection filters is associated with a different direction; and obtaining an output image by applying the shadow to a region identified based on the boundary information.

According to various embodiments, by applying shadowing through accurately detecting a boundary of an object in a high-resolution image, sharpness of an image may be enhanced by making a contour of an object clear, while minimizing amplification of noise of an image.

BRIEF DESCRIPTION OF THE DRAWING FIGURES

The above and/or other aspects, features, and advantages of certain embodiments of the disclosure will be more apparent from the following description taken in conjunction with the accompanying drawings, in which:

FIG. 3B is a view illustrating various examples of a Laplacian filter according to an embodiment;

FIG. 3C is a view provided to describe a method for applying a Laplacian filter according to an embodiment;

FIG. 5 is a view provided to describe a plurality of boundary detection filters according to an embodiment;

FIG. 6A is a view provided to describe a plurality of boundary detection filters according to another embodiment;

FIG. 6B is a view provided to describe a plurality of boundary detection filters according to another embodiment;

DETAILED DESCRIPTION OF THE EMBODIMENTS

Figure 1:
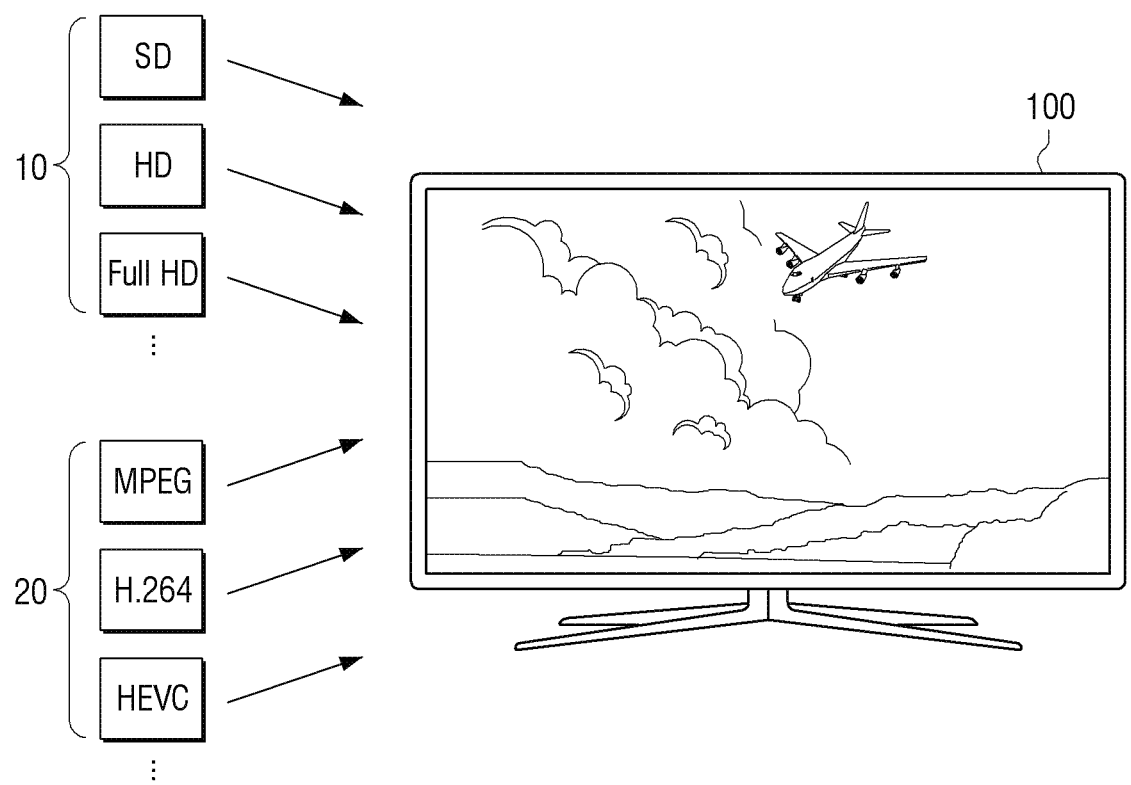
FIG. 1 is a view provided to describe an example of implementation of an image processing apparatus according to an embodiment.

The disclosure will be further described with reference to the attached drawings.

The terms used in this specification will be briefly described, and the disclosure will be described in greater detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

It should be understood that at least one of A or B indicates "A", "B" or one of "A and B".

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown). In some embodiments, the at least one processor is configured to execute program code obtained from at least one memory.

Hereinafter, embodiments will be described in detail with reference to the accompanying drawings so that those skilled in the art may easily carry out the embodiments. However, the disclosure may be embodied in many different forms and is not limited to the embodiments described herein. In order to clearly illustrate the disclosure in the drawings, portions which are not related to the description have been omitted, and like reference numerals have been assigned to similar portions throughout the specification.

FIG. 1 is a view provided to describe an example of implementation of an image processing apparatus according to an embodiment.

An image processing apparatus 100, as illustrated in FIG. 1, may be implemented as a TV or a set-top box, but is not limited thereto, and may be applicable to any device having image processing and/or display function such as a smart phone, a tablet PC, a notebook PC, a head mounted display (HMD), a near-eye display (NED), a large format display (LFD), a digital signage, a digital information display (DID), a video wall, a projector display, a camera, a camcorder, a printer, or the like.

The image processing apparatus 100 may receive various compressed images or images of various resolutions. For example, the image processing apparatus 100 may receive an image in a compressed form such as a moving picture experts group (MPEG) (for example, MP2, MP4, MP7, etc.), joint photographic coding experts group (JPEG), advanced video coding (AVC), H.264, H.265, a high efficiency video codec (HEVC), or the like. The image processing apparatus 100 may receive any one image from among a standard definition (SD) image, a high definition (HD) image, a full HD image, or an ultra HD image.

According to an embodiment, even if the image processing apparatus 100 is implemented as the UHD TV, the UHD contents are not sufficient, and therefore, it frequently happens that an image of SD, HD, full HD, or the like (hereinafter, a low resolution image) is inputted. In this case, the inputted low resolution image may be converted into a UHD image (hereinafter, a high resolution image) and used. However, the texture or edge of the image is blurred during the conversion process of the image, and therefore, there is a problem that details of an image are deteriorated. In some situations, boundaries may not appear clearly to a viewer. The lack of clarity can be due to noise.

According to another embodiment, even if a high-resolution image is inputted, there is a problem in the image compression and decompression processes, or the like, that the details are lost. A digital image requires more data as the number of pixels increases, and when large capacity data is compressed, it is difficult to avoid deterioration of details due to compression. Deterioration of details can include increased distortion of the image after decompression with respect to the original image operated on at the image compression stage.

In the meantime, there are various types of edges in an image. According to an example, the edges may be divided into a complex edge which has various directions and a straight edge which has a clear direction. Among these, straight edges with clear directions mainly appearing in a boundary or a text of an object are the elements which are recognized by a viewer of an image most preferentially, and therefore, processing specialized for the enhancement or presentation of straight edges is an important technique for enhancing the appearance or quality of details in an image.

Accordingly, various embodiments for enhancing details of an image by accurately detecting a straight edge having a clear direction and applying a shadowing effect will be described below.

Figure 2:
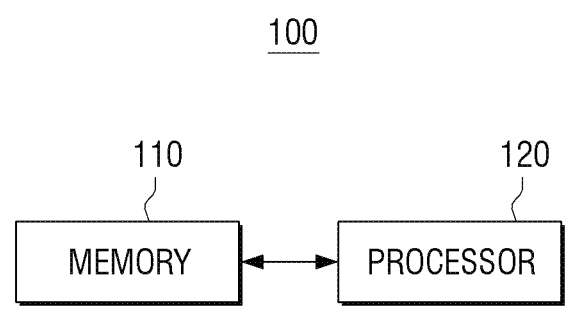
FIG. 2 is a block diagram illustrating a configuration of an image processing apparatus according to an embodiment.

FIG. 2 is a block diagram illustrating a configuration of an image processing apparatus according to an embodiment.

Referring to FIG. 2, the image processing apparatus 100 includes an inputter 110 and a processor 120.

The inputter 110 receives various types of contents. For example, the inputter 110 may receive an image signal in a streaming or downloading manner from an external apparatus (for example, a source apparatus), an external storage medium (for example, universal serial bus (USB) memory), an external server (for example, a web hard), and the like, through a communication method such as access point (AP)-based Wi-Fi (wireless local area network (LAN)), Bluetooth, Zigbee, wired/wireless LAN, wide area network (WAN), Ethernet, IEEE 1394, high-definition multimedia interface (HDMI), USB, mobile high-definition link (MHL), audio engineering society/European broadcasting union (AES/EBU), optical, coaxial, and the like. Here, the image signal may be a digital image signal of any one of the SD, HD, full HD, or ultra HD images, but this is not limited thereto.

The processor 120 may control an overall operation of the image processing apparatus 100.

According to an embodiment, the processor 120 may be implemented with a digital signal processor (DSP), a microprocessor, an artificial intelligence (AI) processor and a time controller (TCON) which process a digital image signal, but this is not limited thereto. The processor 120 may include one or more among a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 120 may be implemented in a system on chip (SoC) type or a large scale integration (LSI) type which a processing algorithm is built therein or in a field programmable gate array (FPGA) type.

In some embodiments, the processor 120 includes one or more CPUs. In some embodiments, the processor 120 includes one or more processors. In some embodiments, the memory 130 includes one or more memories. The one or more processors, in some embodiments, are configured to read instructions and data from the one or more memories. The one or more memories, in some embodiments, are configured to store program code including executable instructions. In some embodiments, the program code is configured to cause the one or more processors to perform the logic of FIG. 14.

The processor 120 performs image processing for the input image and obtains an output image. Here, the input image may be a SD image, a HD image, a full HD image, or the like.

Specifically, the processor 120 may detect a boundary region in the input image, insert a shadow into the detected boundary region (or perform shadow processing for the detected boundary region), and obtain an output image. Here, the output image may be an ultra high definition (UHD) image, in particular, a 4K (3840×2160) UHD image or an 8K (7680×4320) UHD image, but is not limited thereto. Various preprocessing may be performed on the input image before the shadow processing according to an example. Hereinafter, for convenience of description, the input image and the preprocessed image are not distinguished from each other and are referred to as an input image. In addition, the shadow processing according to an embodiment may be performed on an image pre-stored in a memory (not shown), but is limited to an input image for convenience of description.

For convenience of description, a method for obtaining (or generating) a shadow will be described first, and then, a method for obtaining information on a boundary included in an input image, that is, boundary information, will be described. However, according to an embodiment, generating the shadow and obtaining the boundary information may be performed in parallel, or any one may be performed prior to another.

According to an embodiment, the processor 120 may obtain an output image by generating the shadow based on the input image, and applying the generated shadow to a boundary region.

<Generation of the Shadow>

According to an embodiment, the processor 120 may filter the input image, and obtain a signal of a threshold range from the filtered signal as a shadow. Here, the filtered signal may be an output signal of a filter applied to an input image, and may be referred to as filtered data or a filtered value.

In general, if a first-order or a second-order edge detection filter is applied to an input image, a filtered signal that includes edge magnitude and edge direction information (perpendicular to the gradient) may be obtained. Here, the first-order edge detection filter means a filter that detects an edge based on a first-order differentiation signal, and the second-order edge detection filter means a filter that detects an edge based on a second-order differentiation signal. In some embodiments, a first order edge detection filter includes one or more positive filter coefficients, one or more negative filter coefficients, and exhibits one zero crossing between the positive and negative filter coefficients. For example, see FIG. 6B. In some embodiments, a second order edge detection filter exhibits two zero crossings. For example, see FIG. 6A. The edge may mean a region in which spatially adjacent pixel values change drastically. For example, the edge may be a region in which the brightness of an image changes rapidly from a low value to a high value or from a high value to a low value.

Figure 3A:
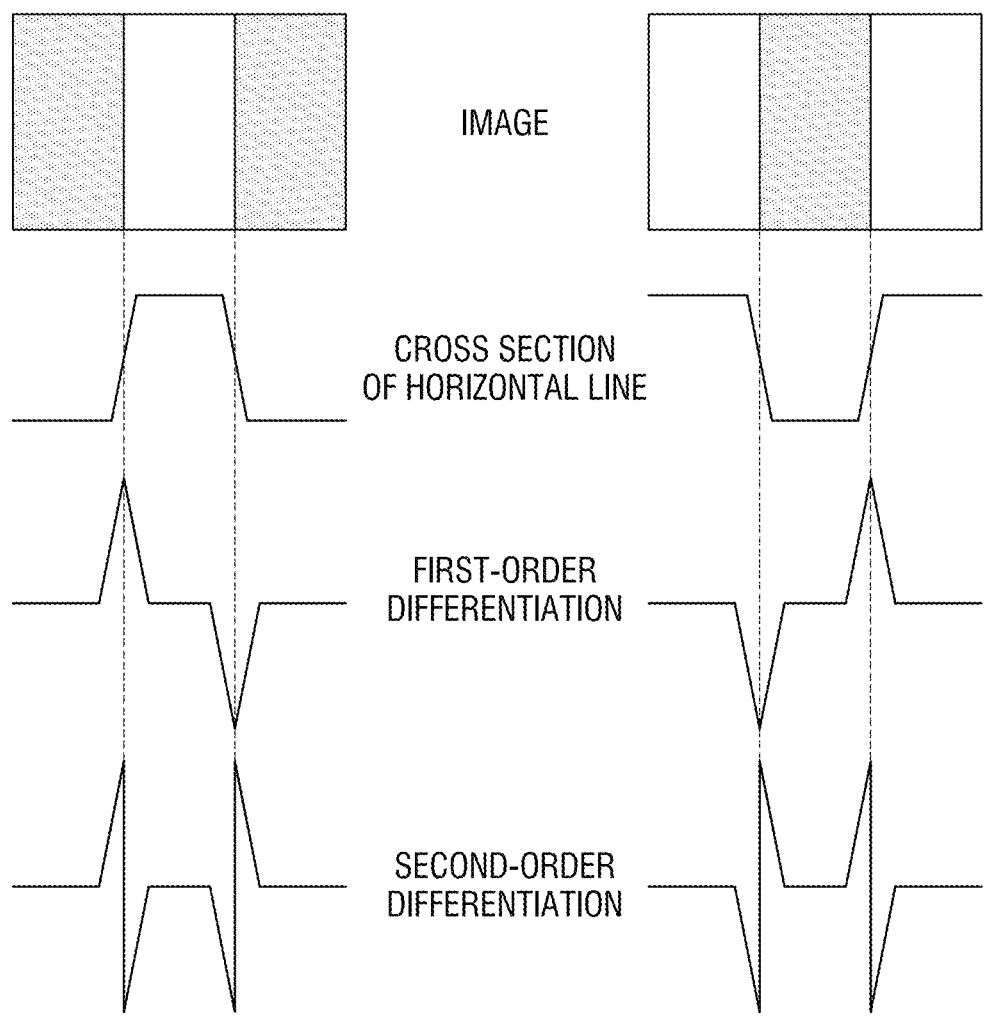
FIG. 3A is a view provided to describe a characteristic of a second-order differentiation signal to help understanding of the disclosure.

As illustrated in FIG. 3A, the first-order differentiation signal has a negative or positive value at an edge portion, whereas, the second-order differentiation signal has a characteristic of zero crossing in which a sign changes at the edge portion. Specifically, the second-order differentiation signal has a negative value when the decreasing tendency of the input signal gets stronger, or the increasing tendency of the input signal gets weaker in the edge portion, and conversely, has a positive value when the decreasing tendency of the input signal gets weaker, or the increasing tendency gets stronger. That is, the second-order differentiation signal has a positive value at the inner boundary and a negative value at the outer boundary as to a dark object, and has a positive value at the outer boundary and a negative value at the inner boundary as to a bright object.

According to an embodiment, the processor 120 may generate the shadow based on the characteristics of the second-order differentiation signal. For example, the processor 120 may generate the shadow based on a positive or a negative signal, that is, a signal having a positive (+) value or a negative (−) value, in the output signal of the second-order differentiation filter.

According to one embodiment, the processor 120 may apply a second-order differentiation filter to an input image and generate the shadow based on a signal having a negative (−) value at the output of the filter. For example, the second-order differentiation filter may be implemented as a Laplacian filter. A left and right portion (or left, right, top, and bottom) of the Laplacian filter is symmetric with respect to the center of the filter, the sum of the coefficients is zero, and the value decreases as the distance from the center increases, so that the sign may have be changed from a positive number to a negative number. That is, the center coefficient may be a non-negative number including zero. As described above, the output of the Laplacian filter of which the center coefficient is a positive number has a sign that is opposite to the second-order differentiation signal. Accordingly, when the processor 120 uses the second-order differentiation signal, the sign of the positive signal included in the second-order differentiation signal may be inverted to generate the shadow. In some cases, the processor 120 may condition the negative signal in the output of the Laplacian filter and generate the shadow. Here, the conditioning may be an operation of clipping, applying a weight to a negative signal or subtracting/adding a signal of a predetermined size.

FIG. 3B is a view illustrating various examples of the Laplacian filter according to an embodiment. That is, the Laplacian filter may be a two-dimensional form of n*n and may be applied to a two-dimensional pixel region. FIG. 3B illustrates the Laplacian filter in a 3*3 format. In this case, the filter used for shadow generation may be implemented to be smaller than the size of the filter used in boundary detection to be described later, but is not limited thereto. In some embodiments, a size of a filter refers to the number of coefficients, n, in the filter along one dimension.

Applying the Laplacian filter to the input image may mean that the Laplacian filter is convolved with the input image. Convolution is an image processing technique using a weighted filter, which means that a pixel value of the input image is multiplied by the corresponding weight (or coefficient) included in the filter and then the sum is obtained. Therefore, convolution generally refers to a sum of products. The multiplicands in each product are taken from the input signal and the filter coefficients. Here, the filter is referred to as a mask, a window, or a kernel. That is, the values included in the Laplacian filter illustrated in FIG. 3B may be a weight (a value indicating how much the corresponding pixels are used).

Figure 3C:
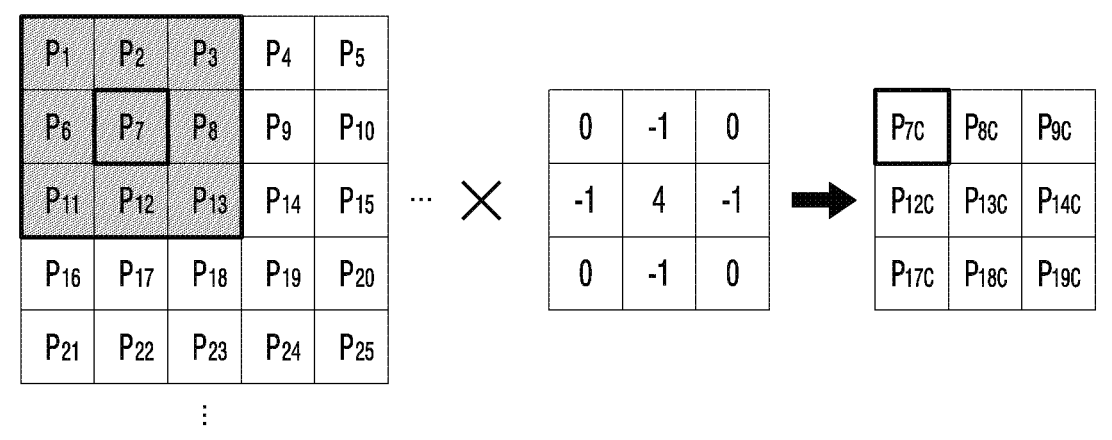

FIG. 3C is a view provided to describe a method for applying the Laplacian filter according to an embodiment.

As illustrated in FIG. 3C, when $P_7$ is a pixel to be processed, the Laplacian filter may be applied with $P_7$ as the center pixel. In this case, the convolution $P_{7C}$ value corresponding to $P_7$ may be obtained by calculation of $P_1*0+P_2*(-1)+P_3*0+P_6*(-1)+P_7*4+P_8*(-1)+P_{11}*0+P_{12}*(-1)+P_{13}*0$. The convolution values corresponding to the remaining pixel values are obtained through the same calculation. However, the pixels (for example, $P_1$ to $P_5$, $P_6$, $P_{11}$, $P_{16}$, $P_{21}$, etc.) located at the corners of the image lack of surrounding pixels for applying the filter. In this case, a filter may be applied after making the image bigger by adding a pixel value (for example, pixel value 0) to an outer region other than the original image, or apply a filter after adding pixels with the same color as the outer boundary of the original image. In the example of FIG. 3C, there are 16 input samples of, for example, an input image, and 9 output values. The filter has 9 values, 5 of which are non-zero. In some examples, the output values are example filter outputs used to obtain a shadow or to identify a boundary region.

Figure 4:
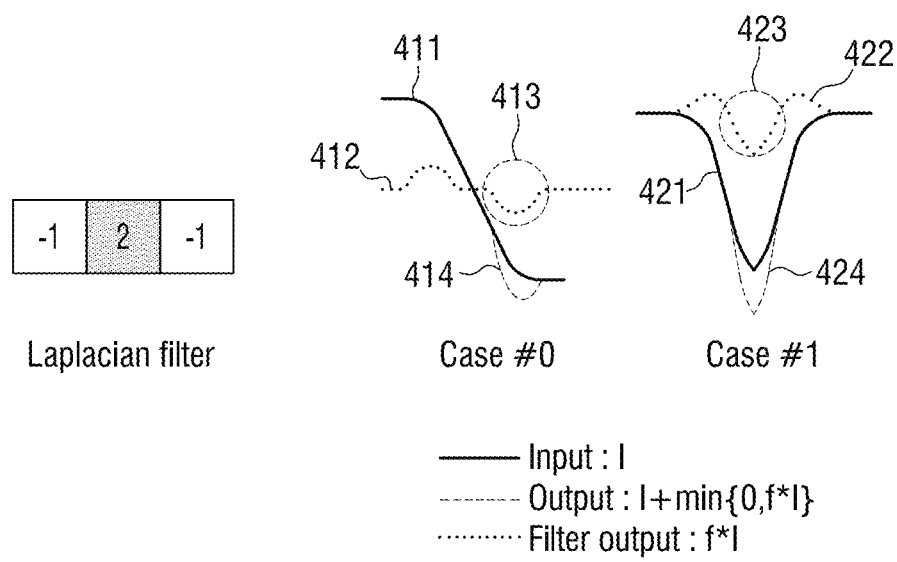
FIG. 4 is a view provided to describe output of a filter according to an embodiment.

FIG. 4 is a view provided to describe output of a filter according to an embodiment.

As illustrated in FIG. 3B, the Laplacian filter may be a two-dimensional (2D) filter. However, in FIG. 4, a one-dimensional filter is applied to a one-dimensional signal for convenience of description.

FIG. 4 is a view illustrating output values of a filter when the first filter {−1, 2, −1} is applied to the one-dimensional signal in the filter illustrated in FIG. 3B. Referring to the outputs 412 and 422 of the filters in case #0 and case #1 shown in FIG. 4, when the decreasing tendency of the input signals 411 and 421 gets stronger or increasing tendency gets weaker, the outputs 412 and 422 have a positive value, or conversely, when the decreasing tendency of the input signals 411 and 421 gets weaker or increasing tendency gets stronger, the outputs 412 and 422 have a negative value.

That is, if the Laplacian filter of which the center coefficient is a positive value is used, an output having a sign opposite to that of the second-order differentiation signal may be obtained. In this case, the processor 120 may obtain the shadow using a signal having a negative value at the output of the Laplacian filter of which center coefficient is a positive number.

According to one embodiment, the processor 120 may utilize a clipping function which generates an output signal by limiting the input signal to a given range in order to generate a shadow. For example, the processor 120 applies the Laplacian filter f to the input image I, and clips only the negative number portion to generate the shadow S. This may be expressed by the following Equation 1.

$$S=\min\{0, f*I\} \quad \text{[Equation 1]}$$

In equation 1, the "*" operator, in some embodiments, refers to convolution. The result of the convolution is then compared term by term with 0, and the minimum taken. Thus, there are no negative values in S.

In case #0 and case #1 of FIG. 4, when the shadows 413 and 423 obtained based on the negative values, among the outputs of the Laplacian filter, are applied to the input signals 411 and 421, the output signals 414 and 424 as shown in FIG. 4 may be obtained. For example, negative values of shadows 413 and 423 are added to the pixel values (or coefficient values) of the input signals 411 and 421, and accordingly, the pixel values (or coefficient values) of the pixel region in which the shadows 413 and 423 are added in the output signals 414 and 424 may have a value smaller than the pixel value (or coefficient) of the input signals 411 and 421. However, this is described to help understanding, and according to one embodiment, the generated shadow may be applied to the input image based on the boundary information as described below.

Meanwhile, according to another embodiment, the processor 120 may generate the shadow using a deep learning based artificial neural network (or in-depth artificial neural network), that is, a learning network model. The learning network model may be designed to obtain the output data desired by the user through successive convolution operation on the input image, and may be implemented as a system for learning a large number of images. For example, at least one of the coefficients (or parameters) or the size of the filter included in the edge detection filter may be learned to output an appropriate shadow image. As an example, the learning network model may be learned to output an image (hereinafter referred to as a shadow image) including a shadow of which magnitude is adjusted based on the characteristics of the input image, when the image is inputted. As another example, if the input image and the shadow image (for example, a shadow image generated based on the second-order differentiation signal) are inputted, the learning network model may be learned to output the shadow image including a shadow of which magnitude is adjusted based on the characteristics of the input image. Here, the characteristics of the input image may include various image characteristics related to the input image, such as resolution, type, edge region distribution, texture region distribution, color distribution, or the like.

For example, the learning network model may be implemented as at least one deep neural network (DNN) model from among convolutional neural network (CNN), recurrent neural network (RNN), long short term memory network (LSTM), gated recurrent units (GRU), or generative adversarial networks (GAN).

<Detection of Boundary>

Aside from the shadow generation, the processor 120 may obtain information on boundaries included in the input image, that is, boundary information. In the disclosure, a boundary means an edge of which direction is clear and straight and/or an edge having clear direction and a thickness which is greater than or equal to a threshold value, and thus, may be distinguished from a complex edge of which directions are diverse. For example, the boundary may be a boundary of an object, a text, or the like. A straight edge may be identified by recognizing when a same boundary detection filter has a high value for two neighboring pixel blocks (agreement about direction between neighbors). A complex edge may correspond to two neighboring pixel blocks corresponding to maximum boundary detection filter outputs for different boundary detection filters (disagreement about direction between neighbors). In some embodiments, a single longer filter is used to effect an averaging between neighboring pixel blocks. More description of boundary detection filters is provided below.

Shadowing is only applied to edges having clear and straight directions. Those straight boundaries are found by detection. In a high-resolution image such as 8k image, the shadowing for an edge, that is, a boundary, having a clear and straight direction improves image quality. However, if shadowing is applied even to complex edges with various directions, noise may increase, resulting in deterioration of the image quality. It is important to determine which edges are suitable for the addition or insertion of shadowing.

The boundary information may be information including at least one of position information (or coordinate information), magnitude information, or direction information for a pixel detected as a boundary. According to one example, the boundary information may be implemented in the form of at least one of a map or a table. For example, the boundary information may have a structure in which magnitude information corresponding to each pixel block is arranged in a matrix form of a pixel block unit. As used herein, the term "pixel block" refers to a set of adjacent pixels including at least one pixel, and "region" is a term referring to a portion of the image, and may mean at least one pixel block or a set of pixel blocks.

Specifically, the processor 120 may obtain boundary information by applying a plurality of boundary detection filters having different directions to the input image. Here, the boundary detection filter may be implemented by an nth-order differential filter (for example, the first-order differentiation filter or the second-order differentiation filter). For example, the processor 120 may use the Laplacian filter, which is the second-order differentiation filter, for boundary detection. However, the embodiment is not limited thereto, and for some cases, at least one of a Roberts filter, a Sobel filter, a directional filter, a gradient filter, a difference filter or a Prewitte filter may be used. An example of a Prewitte filter or kernel is a first-order differential filter for detection of horizontal edges and has 9 filter coefficients arranged in a 3*3 matrix. The first row of the matrix has elements [1 1 1]. The second row has elements [0 0 0]. The third row has elements [−1 −1 −1]. However, for the boundary detection, it may be desirable to use a filter of the same type as that used in shadow generation. For example, if the second-order differentiation filter is used in shadow generation and the first-order differentiation filter is used in boundary detection, the position of the boundary detected by the first-order differentiation filter may be different from the edge position detected by the second-order differentiation filter for shadow generation. However, in some cases where the shadow is not applied to the boundary which is detected by the first-order differentiation filter, it is also possible to detect the boundary by using the first-order differentiation filter of a type different from the second-order differentiation filter used for the shadow generation.

Hereinbelow, for convenience of description, a case of detecting a boundary using the Laplacian filter will be described.

In a high-resolution image having a large number of pixels, the number of pixels constituting edges to be detected also increases. Accordingly, the size of the filter for edge detection increases as well. For example, when a compressed low-resolution input image is enlarged and outputted on a high-resolution display, the edges included in the input image are also enlarged. In order to detect the edge in this enlarged image, a corresponding large-size filter has to be used. Accordingly, the Laplacian filter used for boundary detection may be larger than the Laplacian filter used for the above-described shadow generation. For example, the size may be 5*5 or more (or 7*7 or more), but is not limited thereto. According to one embodiment, in the case of the shadow generation, if the shadow is generated in a small edge unit, more natural shadow generation is available. Therefore, when generating the shadow, the shadow may be generated using a filter having a size smaller than that in the case of the boundary detection.

If the number of the boundary detection filters is N according to an example, the nth boundary detection filter may have a direction of 180*(n−1)/N. Here, the plurality of boundary detection filters may be four or more. For example, the plurality of boundary detection filters may include a first filter in which the same filter coefficient is overlapped (or repeated) in a line unit in the first direction, a second filter in which the same filter coefficient is overlapped (or repeated) in a line unit in the second direction, a third filter in which the same filter coefficient is overlapped (or repeated) in a line unit in the third direction, and a fourth filter in which the same filter coefficient is overlapped (or repeated) in a line unit in the fourth direction. However, as the size of the filter increases, the performance to distinguish between complex edges and straight edges may be degraded. Accordingly, in the disclosure, a plurality of filters having different directions in proportion to the size of the filter may be added to accurately detect a straight edge, that is, a boundary having a clear direction.

Figure 5:
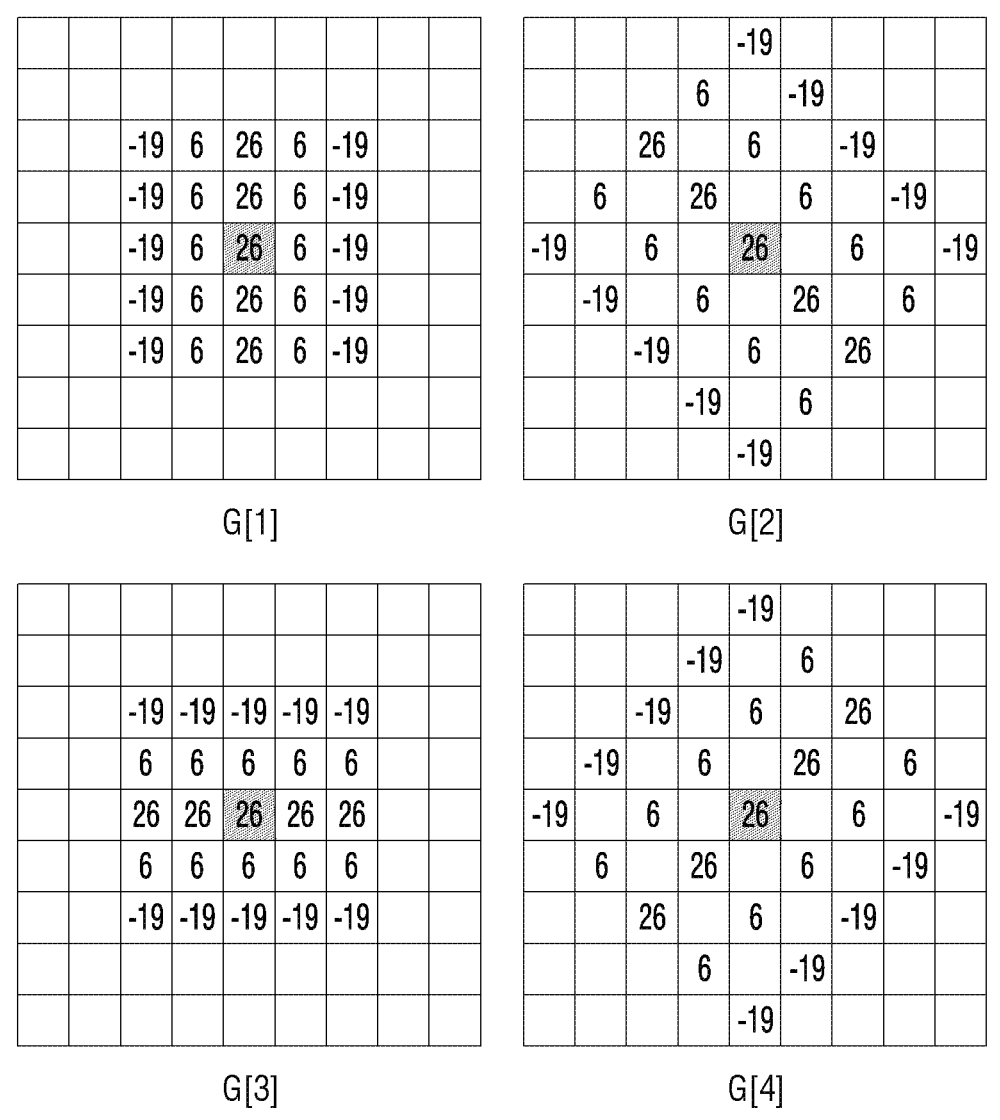

FIG. 5 is a view provided to describe a plurality of boundary detection filters according to an embodiment.

In FIG. 5, the number of the plurality of boundary detection filters is four, and the size of the plurality of boundary detection filters is in a size of 5*5, but the embodiment is not limited thereto. In addition, it is assumed that the plurality of boundary detection filters are symmetrical two-dimensional filters having the form of a Laplacian filter in the corresponding direction and the coefficients {−19, 6, 26, 6, −29} are repeated in the corresponding direction (see G[1], G[2], G[3], and G[4] of FIG. 5), but the embodiments are not limited thereto.

In this case, if the $n^{th}$ boundary detection filter is implemented to have a direction in an angle of 180*(n−1)/N, then the first boundary detection filter G (1) has a direction of 0 degrees, and the second boundary detection filter G (2) has a direction of 180*(2−1)/4=45 degrees. Similarly, the third boundary detection filter G (3) and the fourth boundary detection filter G (4) have a direction of 90 degrees and 135 degrees, respectively. As described above, when four boundary detection filters are used, an edge having one of the directions shown in this symbol: , may be detected. For example, an edge of direction of 0, 45, 90, 135, 180, 225, 270, and 315 degrees may be detected.

In this case, the second to the fourth boundary detection filters may be obtained by rotating the first boundary detection filter by the corresponding angle. Accordingly, if only the first boundary detection filter is stored in a memory (not shown), the second to fourth boundary detection filters may be obtained. According to an embodiment, all the first to fourth boundary detection filters may be stored in the memory (not shown).

Figure 6A:
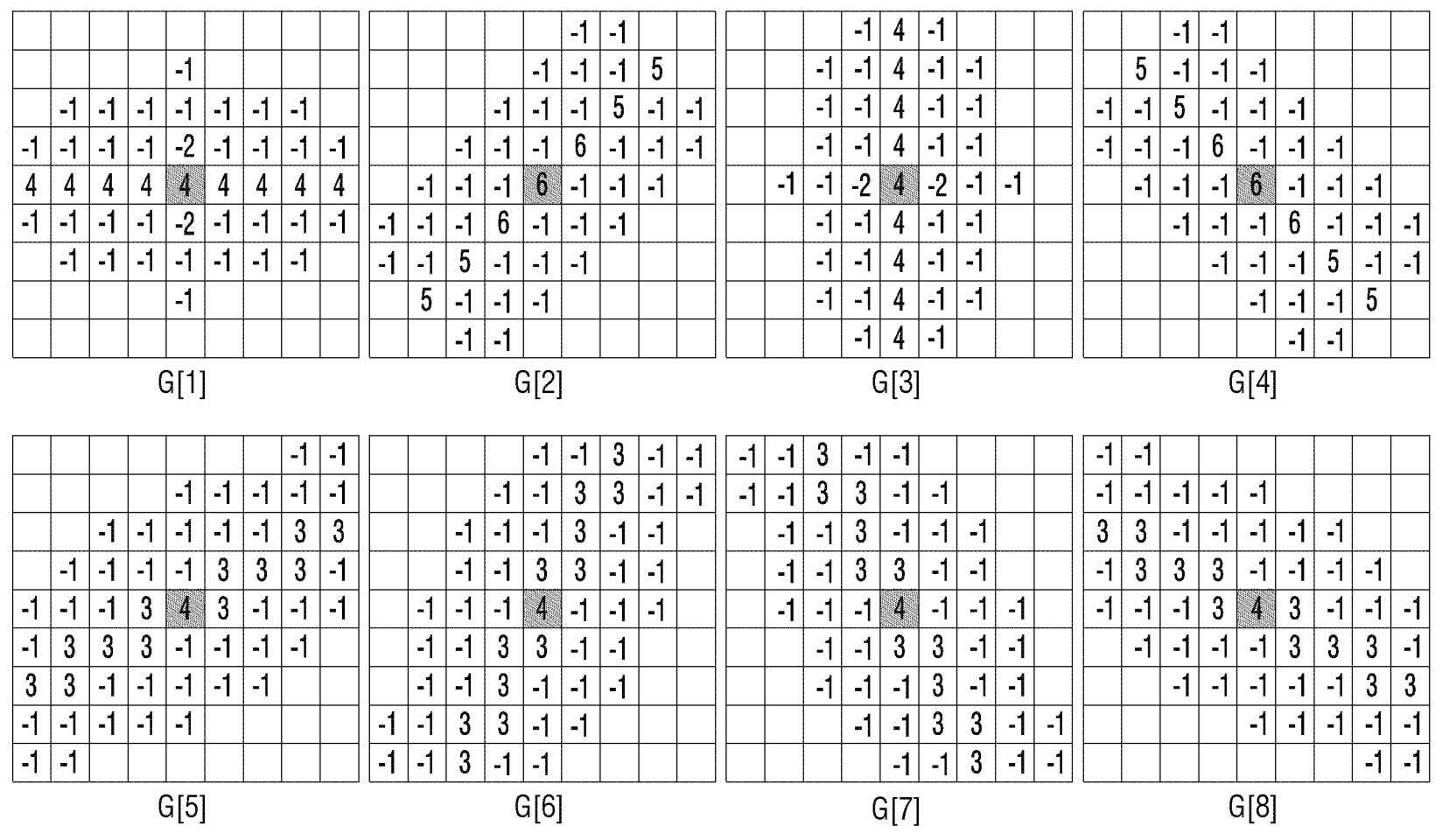
Figure 6B:
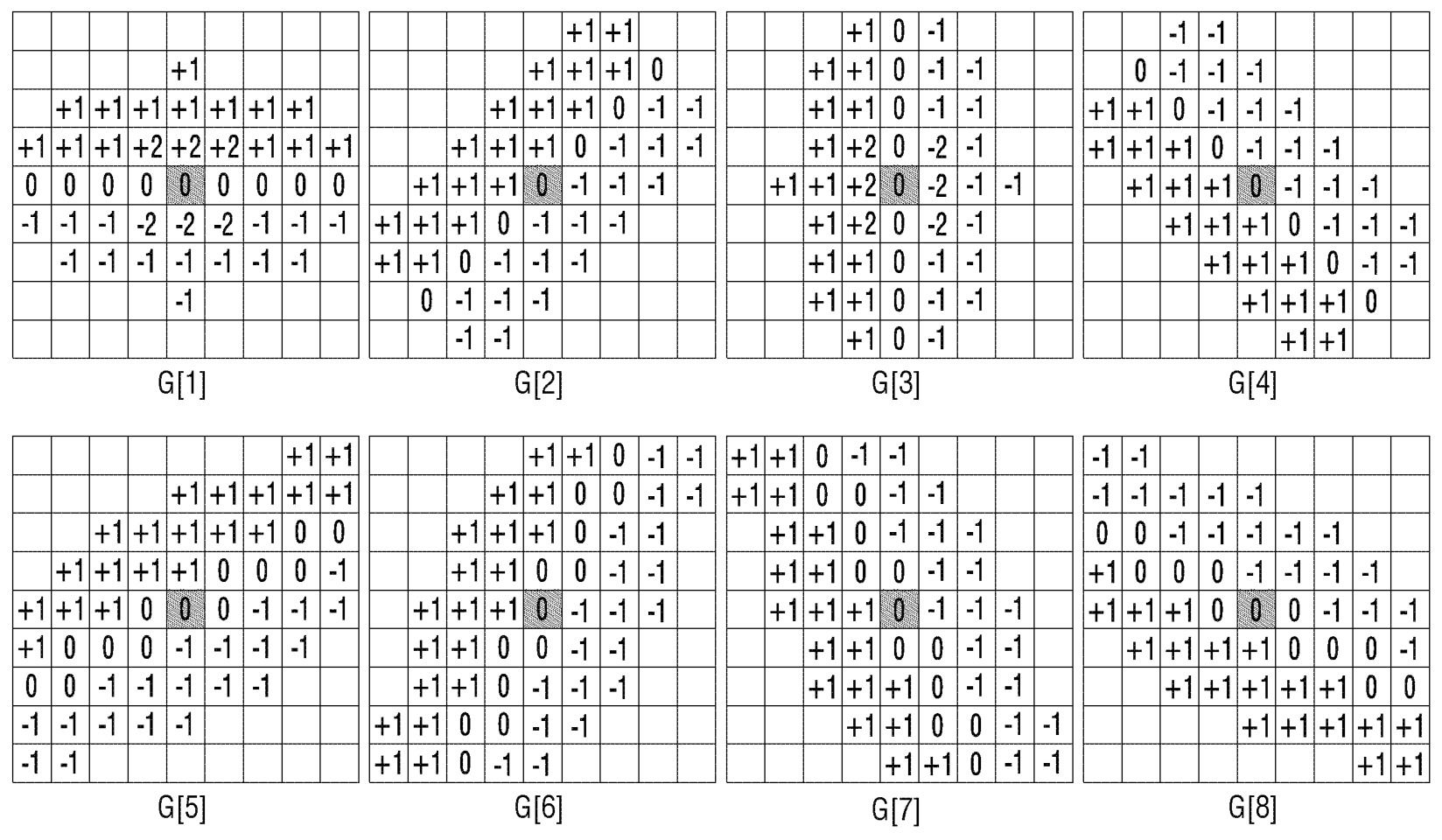

FIGS. 6A and 6B are views provided to describe a plurality of boundary detection filters according to another embodiment.

FIG. 6A illustrates that the plurality of boundary detection filters are eight second-order differentiation filters. The plurality of the boundary detection filters may be implemented to have a format of the Laplacian filter in the corresponding direction but the embodiment is not limited thereto.

In this case, if the n$^{th}$ boundary detection filter is implemented to have a directional angle of 180*(n−1)/N, then the first boundary detection filter G(1) has the direction of 0 degrees, and the second boundary detection filter G(2) has a direction of 180*(2−1)/8=22.5 degrees. Similarly, the third to eighth boundary detection filters G(3), G(4), G(5), G(6), G(7), and G(8) have direction of 45, 67.5, 90, 112.5, 135, and 157.5 degrees, respectively. That is, a filter having a direction of 22.5, 67.5, 112.5, and 157.5 degrees as compared with the embodiment shown in FIG. 5 may be added. As described above, when the eight boundary detection filters are used, an edge having one of the directions shown in this symbol: , may be detected. For example, an edge in a direction of 0, 22.5, 45, 67.5, 90, 112.5, 135, 157.5, 180, 202.5, 225, 247.5, 270, 292.5, 315, and 337.5 may be detected.

In this case, the second to eighth boundary detection filters may be obtained by rotating the first boundary detection filter by a corresponding angle. Accordingly, if only the first boundary detection filter is stored in the memory (not shown), the second to eighth boundary detection filters may be obtained. In the meantime, according to an embodiment, first to eighth boundary detection filters may be stored in the memory (not shown).

In the meantime, the center coefficient located at the center, among the coefficients of the filter, may be different depending on the thickness of the boundary region to be detected. For example, the larger the center coefficient is, an edge with the thinner thickness may be detected. Accordingly, the processor 120 may apply the filter having the corresponding coefficient based on the thickness of the boundary to be detected.

FIG. 6B illustrates an embodiment in which the plurality of boundary detection filters are eight first-order differentiation filters.

Similar to FIG. 6A, each of the eight filters G (1) to G (8) has a direction of 0, 22.5, 45, 67.5, 90, 112.5, 135, and 157.5 degrees. The eight filters may detect an edge having one of the directions shown in this symbol:  in the same manner as FIG. 6A. For example, an edge in the direction of 0, 22.5, 45, 67.5, 90, 112.5, 135, 157.5, 180, 202.5, 225, 247.5, 270, 292.5, 315, 337.5 degrees may be detected.

For example, the size of the boundary detection filter shown in FIGS. 6A and 6B is larger than the size of the boundary detection filter shown in FIG. 5. In this case, a thicker edge may be detected than the boundary detection filter shown in FIG. 5. However, as the size of the filter increases, the performance of distinguishing between a complex edge and a straight edge may be deteriorated. Therefore, as shown in FIGS. 6A and 6B, a plurality of filters having different direction than FIG. 5 may be additionally used.

According to an embodiment, the processor 120 may apply a filter of different sizes according to the characteristics of a boundary region to be detected.

For example, in the case of applying the shadow only to an edge having a thickness which is greater than or equal to a first threshold, the processor 120 may use the first filter in the size corresponding to the thickness.

As another example, in the case of applying the shadow only to an edge having a thickness which is less than the first threshold, and is greater than or equal to a second threshold, a second filter in the size corresponding to the thickness may be used.

As yet another example, when the processor 120 is configured to apply the shadow only to an edge having a thickness less than the second threshold value, a third filter having a size corresponding to the thickness may be used. The thickness to be detected may be indicated, for example, in program code, in input data provided to the processor, or by a learning process. Here, the size of the second filter may be smaller than the size of the first filter, and the size of the third filter may be smaller than the size of the second filter. In this case, the first filter may be a low pass filter that filters relatively low frequency band signals (e.g., thick edges) in the frequency domain, the second filter may be a band pass filter which filters a mid-band signal (e.g., edges in mid thickness), and a third filter may be a high frequency filter that filters a high frequency band signal (e.g., a fine edge).

In the meantime, the processor 120 may obtain a plurality of filter output values by applying each of a plurality of boundary detection filters to the pixel block, and obtain boundary information for the pixel block based on at least one of the plurality of filter output values. A method of applying the boundary detection filter to the pixel block is the same as the convolution method of FIG. 3B, and it will not be further described. Here, the plurality of filter output values may include at least one of magnitude, position information, or direction information of the boundary included in the image.

Since the direction of a plurality of boundary detection filters is different, a plurality of filter output values are different for each pixel block. For example, if the processor 120 uses the second-order differentiation filter, the first pixel block includes the smallest negative value of which the output value of the first boundary detection filter is the smallest. In the case of the second pixel block, a negative value of which the output value of the second boundary detection filter is the smallest may be included. That is, the negative value of which the output value of the boundary detection filter having the direction which is most similar to the direction of the edge included in the corresponding pixel block is the smallest, from among the output values of the plurality of boundary detection filters, may be included.

According to one embodiment, when the processor 130 detects a boundary using the second-order differentiation filter having a positive center coefficient, for example, the Laplacian filter, the boundary information may be obtained based on the magnitude of the largest negative value, among a plurality of filter output values. This is because the output value of the second-order differentiation filter has the zero crossing characteristic in which the sign changes in the boundary region, and the shadow according to an embodiment is generated based on the negative value, among the output value of the second-order differentiation filter. The boundary detected according thereto may coincide with at least some of the generated shadow regions. The reason for using the smallest negative value among the plurality of filter output values is that the magnitude of the output value of each second-order differentiation filter may be different depending on the direction of the boundary included in each pixel block. That is, the output value of the second-order differentiation filter having the direction which is most similar to the direction of the edge included in the corresponding pixel block may be the smallest negative value.

The above process may be represented using a max function as shown in Equation 2 below.

$$B_0 = \max\{0, -(G[n]*-I)\} \quad \text{[Equation 2]}$$

Here, $B_0$ may be the magnitude of the smallest negative value among the plurality of filter output values, $G[n]$ is the $n^{th}$ filter, I is the input image, and $G[n]*I$ may be the output values of the $n^{th}$ filter determined by convolution. Numerically, for example, −10 is smaller than −9.

According to an embodiment, the processor 120 may normalize $B_0$ which is the magnitude of the smallest negative value, among the plurality of filter output values, and obtain the boundary information. For example, the processor 120 may obtain a boundary map (B) by converting $B_0$ based on Equation 3 below.

$$B = \begin{cases} \min\{1, \text{Slope} \times (B_0 - Th)\} & Th < B_0 \\ 0 & \text{Othwerwise} \end{cases} \quad \text{[Equation 3]}$$

As illustrated in Equation 3, when a min function is applied to 1 and the value obtained by subtracting the threshold Th from $B_0$, among the plurality of the filter output values, the boundary map (B) which is normalized to a value between 0 and 1 may be obtained. The numbers included in the obtained boundary map (B) may be used as a weight for the shadow. That is, the boundary map (B), in which, when the magnitude is low by less than or equal to the threshold, the weight 0 is applied, and when the magnitude increases, the weight increases in proportion to increasing magnitude, may be obtained.

In this case, the threshold and the slope value may be fixed values which are predefined, or variable values that vary depending on at least one of image characteristics, image type, boundary magnitude, shadow type, or shadow magnitude. For example, the threshold may vary depending on the magnitude of the boundary to be detected. For example, when the boundary of the strong magnitude is to be detected, the threshold may be set to a relatively small value, and when the boundary of the weak magnitude is to be detected, the threshold may be set to a relatively large value. The slope value may adjust the degree to which the size $B_0$ of the smallest negative value and the boundary information B are proportional. Accordingly, when the weight is to be adjusted to be relatively large in proportion to the magnitude, the slope value may be set to a large value, and when the weight value is to be adjusted to be relatively small in proportion to the magnitude, the slope value may be set to a small value.

According to another embodiment, when the processor 120 detects the boundary using the first-order differentiation filter, the boundary information may be obtained based on the maximum absolute value, from among a plurality of filter output values. The output value of the first-order differentiation filter may not distinguish the inside and outside of an object, as illustrated in FIG. 3A. Accordingly, the boundary region in which the shadow is generated, unlike the output value of the second-order differentiation filter, may not be accurately detected, but in the case of inserting the shadow by detecting a wide boundary region, it is possible to detect the boundary region using the first-order differentiation filter.

Equation 4 below represents a process of acquiring the boundary information based on the maximum absolute value, from among output values of a plurality of the first-order differentiation filters as an equation.

$$Mag = \max\{|G[i]|\} \quad \text{[Equation 4]}$$

According to an embodiment, the processor 120 may obtain the boundary information by normalizing the maximum absolute value, from among a plurality of filter output values. For example, by applying the threshold to the maximum absolute value $\max\{|G[i]|\}$, among a plurality of filter output value ($G[i]$), the boundary information (B) in the range of 0 to 1 may be obtained.

Equation 5 below represents a process of obtaining the maximum absolute value, from among the plurality of filter output values, as an equation.

$$Mag = \max\{|G[i]|\} \quad \text{[Equation 5]}$$

Equation 6 below represents a process of obtaining the boundary information by normalizing the output value having the maximum absolute value, from among a plurality of filter output value.

$$B = \begin{cases} \min\{1, \text{Slope} \times (\text{Mag} - Th)\} & Th < \text{Mag} \\ 0 & \text{Othwerwise} \end{cases} \quad \text{[Equation 6]}$$

In Equation 6, $B_0$ of Equation 3 is substituted with Mag and thus will not be further described.

In the above-described embodiment, it has been described that the boundary information for the pixel block is obtained on the basis of the smallest negative value or the maximum absolute value among the plurality of filter output values, but is not limited thereto. For example, in the case of the second-order differentiation filter (Laplacian filter), an average magnitude of the negative value, from among a plurality of filter output values, may be used, and in the case of the first-order differentiation filter, the boundary information for the pixel block may be obtained based on an average value of the plurality of filter values. Alternatively, boundary information may be obtained by multiplying the size or maximum absolute value of the smallest negative value (or positive value) by an arbitrary weight.

The processor 120 may apply the shadow to the input image based on the boundary information, and obtain the output image. Here, the boundary information may include the position information of the boundary region. That is, the processor 120 may insert the shadow to only a boundary region which is identified by the boundary information, from among a lot of edge regions in which the shadow is generated.

In addition, the boundary information may include magnitude information of the boundary region. In this case, the processor 120 may identify the boundary region based on the position information, apply the magnitude information corresponding to the identified boundary region to the shadow corresponding to the identified boundary region, and insert the shadow to which the magnitude information is applied into the identified boundary region.

In addition, the boundary information may include at least one of direction information or size information of the boundary region. In this case, the processor 120 may apply different weights to the magnitude of the boundary region based on at least one of direction information or size information.

According to an embodiment, the processor 120 may obtain the output image by multiplying the obtained shadow S by the boundary information (that is, the boundary map B) as the weight, and then adding the weighted shadow to the input image I. This process may be represented as Equation 7 below.

$$O=I+B*S \qquad \text{[Equation 7]}$$

According to another embodiment, the processor 120 may additionally adjust at least one of the shadow or the boundary magnitude, based on the characteristic of the boundary region.

According to an embodiment, the processor 120 may apply additional weight to at least one of the shadow or the boundary magnitude based on at least one of the magnitude or direction of the boundary region. In this case, the processor 120 may apply the different weights based on at least one of the magnitude or the direction of the boundary region.

In another example, the processor 120 may apply an additional weight to at least one of the shadow or boundary magnitude based on at least one of the distance (or density) between the boundary region and another boundary region or the characteristics of the region adjacent to the boundary region. In this case, the processor 120 may apply different weights based on at least one of the distance (or density) between the boundary region and the other boundary region, or the characteristics of the region adjacent to the boundary region.

As still another example, the processor 120 may apply additional weights to at least one of the shadow or boundary magnitude based on at least one of the size or type of the boundary region. For example, the processor 120 may apply different weights to the boundaries of objects such as a text and a building, or the like. Alternatively, the processor 120 may apply different weights to the boundaries of absolutely (for example, based on the threshold) or relatively large size or boundaries of other sizes.

As described above, the processor 120 may detect the boundary area for applying the shadowing by adjusting at least one of the size of the filter, the threshold (Equations 3 and 6), or the slope value (Equations 3 and 6).

According to another embodiment, the detection of the boundary region may be performed using a deep learning-based artificial neural network (or in-depth artificial neural network), that is, by using a learning network model. For example, the learning network model may learn at least one of a coefficient, or size of plurality of boundary detection filters to detect a boundary region suitable for shadow insertion in the input image.

According to still another embodiment, both of the shadow generation and boundary detection described above may be performed using a learning network model. For example, the learning network model may learn at least one of the coefficient, size, or magnitude of the edge detection filter used for generation of the shadow, and learn at least one of the coefficient, size, and magnitude of a plurality of boundary detection filters to detect a boundary region suitable for shadow insertion. In this case, the learning network model may include the first learning network model for the shadow generation and the second learning network model for obtaining the boundary information. The processor 120 may obtain the output image by multiplying the output of the first learning network model and the output of the second learning network model. However, according to another embodiment, the above-described shadow generation, boundary detection, and shadow insertion may all be performed using the learning network model. That is, when the input image is inputted to the learning network model, the output image in which the shadow is inserted may be outputted from the learning network model. In some cases, the first learning network model and the second learning network model may perform learning by exchanging parameters.

Although only shadow insertion processing according to an embodiment has been described in the above embodiments, another image processing such as noise removal processing, sharpening, texture processing, scaling, and the like may be additionally performed. According to one example, the processor 120 may perform noise removal processing before edge detection. In general, noise is generated in a process of compressing and transmitting an image, or the like. The reason for performing the noise removal processing is that noise may not only deteriorate the image quality but also reduce other image processing effects such as the boundary detection described above. According to one embodiment, the processor 120 may perform noise removal by using a method of non-local filtering and self-similarity approach, a smoothing filter using low pass filtering, or the like.

Meanwhile, the shadow insertion processing may be performed before or after scaling of the image according to an embodiment. For example, after scaling to magnify a low-resolution image into a high-resolution image, the above-described image processing is performed, or a scaling may be performed after performing the image processing described above in the process of decoding the compressed image.

FIGS. 7A to 7D are views provided to describe an image processing method according to an embodiment.

Figure 7A:
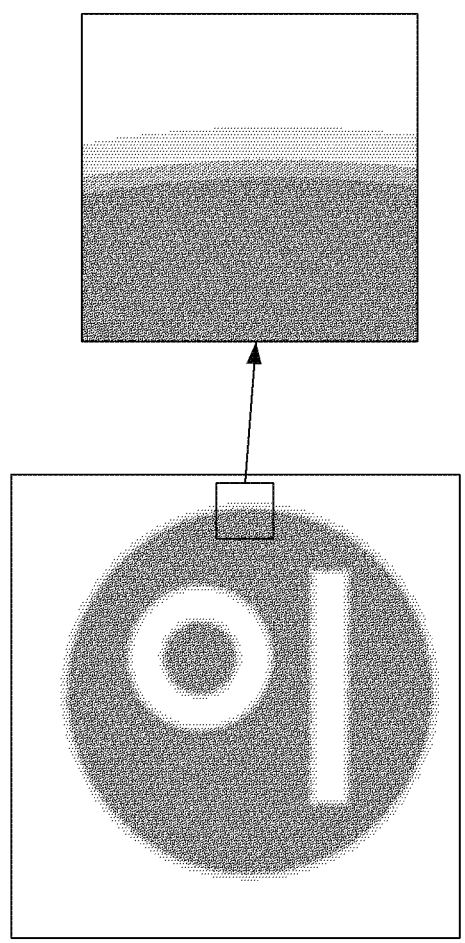
FIG. 7A is a view provided to describe an example of an input image according to an embodiment.
Figure 7B:
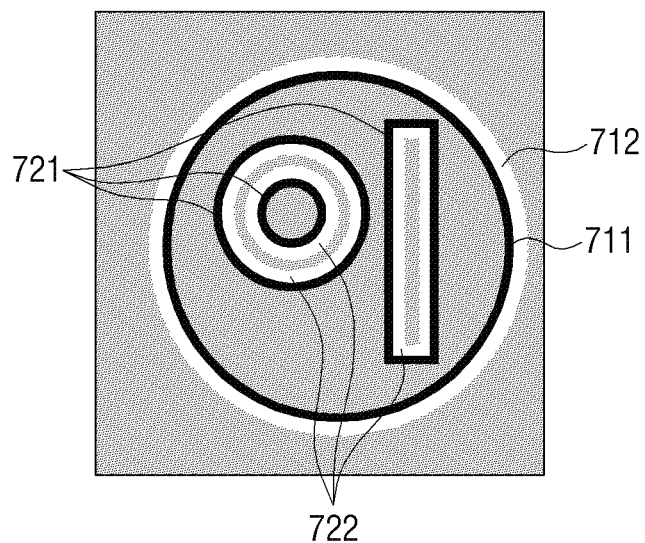
FIG. 7B is a view provided to describe a second-order differentiation image according to an embodiment.

When the second-order differentiation filter, for example, the Laplacian filter of which the center coefficient is the positive number, is applied to the input image of FIG. 7A, the filter output as FIG. 7B may be obtained.

In this case, the filter output has a negative value 711 at the inner boundary and a positive value 712 at the outer boundary of the dark object "circle", as shown in FIG. 7B. In addition, the filter output has a negative value 721 at the outer boundary of the bright object text " ㅇ]" and a positive value 722 at the inner boundary of the bright object. In some embodiments, the object text may be from a language other than English. As shown in FIG. 3, the second-order differentiation value of the Laplacian filter has a negative value at the inner boundary and a positive value at the outer boundary of the dark object, a negative value at the outer boundary and a positive value at the inner boundary of the bright object.

Figure 7C:
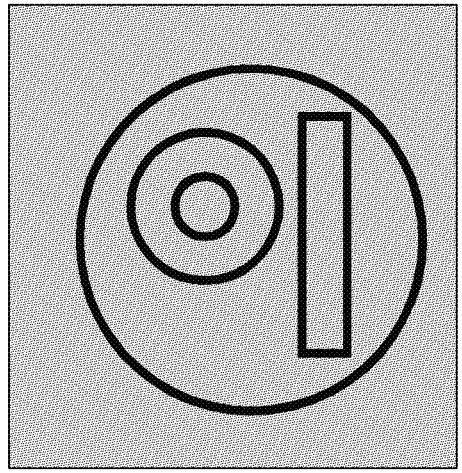
FIG. 7C is a view illustrating a shadow image according to an embodiment.

Subsequently, as shown in FIG. 7C, the shadow may be generated using only the negative values 711 and 721 in the filter output in FIG. 7B. For example, the processor 120 may identify a region having a negative value using a clipping function that limits the input signal to a given range and generates an output signal. In this case, the region having a negative value may be at least one of the inner boundary of the dark object or the outer boundary of the bright object. According to FIG. 7C, it may be confirmed that a shadow which darkens the inner boundary of the circle (dark object) and the outer boundary of the text "ㅇ]" (bright object) is generated.

Figure 7D:
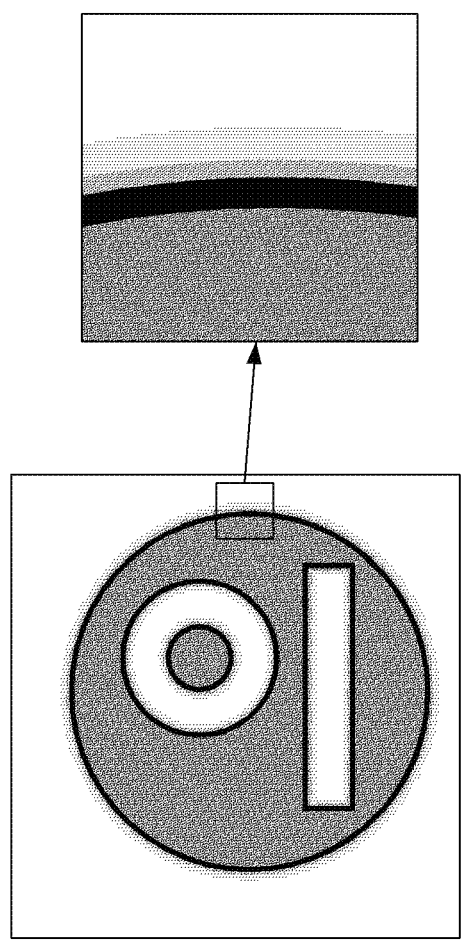
FIG. 7D is a view provided to describe an output image according to an embodiment.

By adding the generated shadow (FIG. 7C) to the input image, the output image as FIG. 7D may be obtained. Referring to FIG. 7D, a contour of a text becomes clear as compared to the input image and sharpness is enhanced.

Figure 8A:
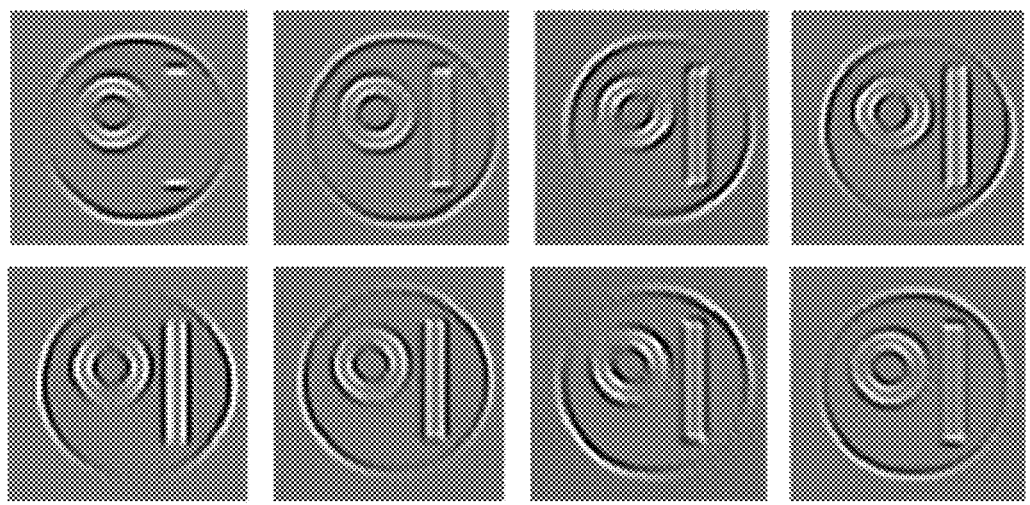
FIG. 8A is a view provided to describe a boundary detection effect according to an embodiment.
Figure 8B:
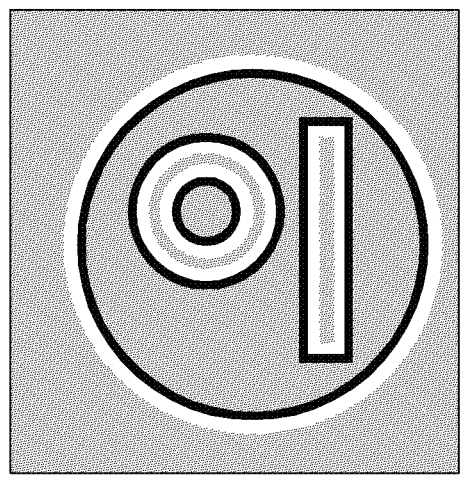
FIG. 8B is a view provided to describe a boundary detection effect according to an embodiment.

FIGS. 8A and 8B are views provided to describe an effect of boundary detection according to an embodiment.

FIG. 8A illustrates a result of detecting the boundary by applying the Laplacian filter having eight different direction (for example, FIG. 6A or FIG. 6B) to the input image as shown in FIG. 7A. As shown, it may be seen that the filters having different directions successfully detect the boundaries for the corresponding directions while not successfully detecting the boundaries for the other directions. In addition, since the Laplacian filter having a positive center coefficient is used, it may be confirmed that the inner boundary and the outer boundary of the object have different signs (positive and negative).

FIG. 8B illustrates a result of estimating a boundary of the same form in all directions based on the smallest negative value or largest positive value, among a plurality of boundary detection values obtained in each pixel region according to an embodiment. For example, when using the smallest negative value among the output values of each filter shown in FIG. 8A, it is possible to detect an inner boundary of a dark object (a circle region) and an outer boundary of a bright object (a text "ㅇ]"), and when using the largest positive value, the outer boundary of the dark object (the circular region) and the inner boundary of the bright object (the text "ㅇ]") may be detected. Accordingly, the boundary detection result as shown in FIG. 8B may be obtained.

Figure 8C:
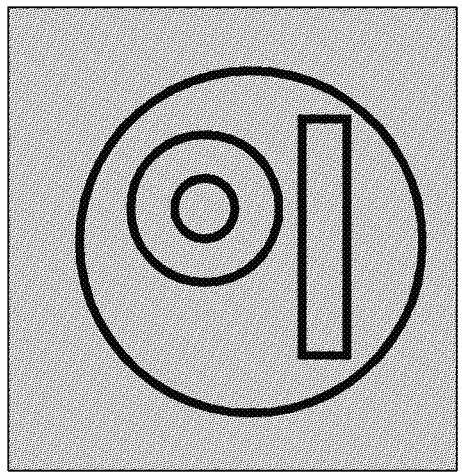
FIG. 8C is a view provided to describe a boundary detection effect according to an embodiment.

FIG. 8C illustrates only the extracted negative value region (dark region) to insert the shadow effect, from the boundary detection result of FIG. 8B. Here, the extracted negative value region may be the outer boundary of the bright object (text "ㅇ]") or the inner boundary of the dark object (circle region).

Figure 9:
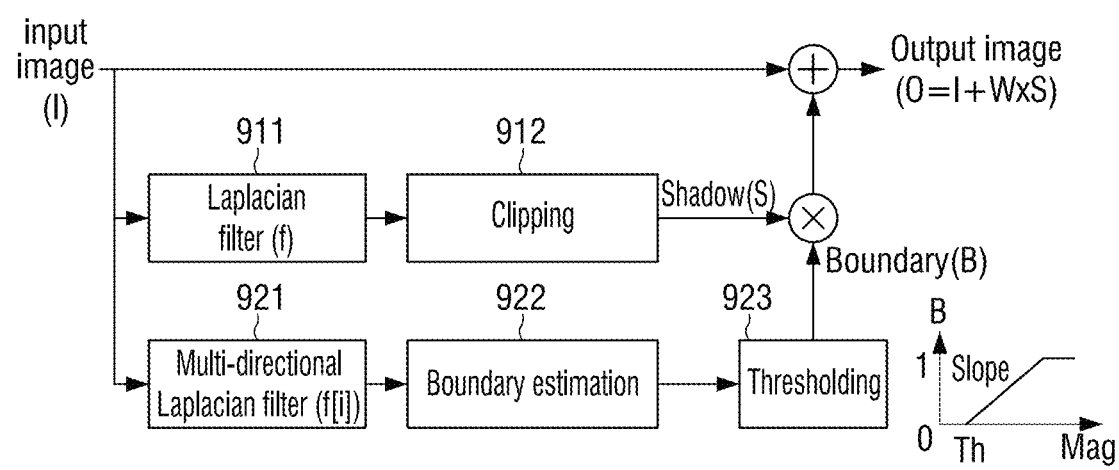
FIG. 9 is a view provided to describe an example of implementation of an image processing method according to an embodiment.

FIG. 9 is a view provided to describe an example of implementation of an image processing method according to an embodiment.

In FIG. 9, it is illustrated that the Laplacian filter is used for generating the shadow and detecting the boundary, but is not limited thereto.

Referring to FIG. 9, the processor 120 my apply the first Laplacian filter f for generating the shadow and the second Laplacian filter F[i] for detecting the boundary to the input image I, respectively, in steps S911 and S921. Here, the first Laplacian filter f may be implemented as a smaller size than the second Laplacian filter F[i]. In addition, the second Laplacian filter F[i] may include a plurality of filters having different direction.

The processor 120 may generate the shadow S by clipping the negative value portion of the output of the first Laplacian filter f, that is, the second-order differentiation signal 912. This process may be expressed as Equation 1 described above. In addition, the processor 120 may estimate the boundary based on the output F(i)*I of the second Laplacian filter (F(i)) 922. Specifically, the processor 120 may estimate the boundary based on the size $B_0$ of the smallest negative value among a plurality of filter output values having different direction. This process may be represented as Equation 2 above.

The processor 120 may obtain the boundary information (B) (for example, the boundary map), that is, the weight, by applying the threshold Th to $B_0$ which is the smallest negative value, from among the plurality of filter output values 923. Through this processor, as for the magnitude which is less than or equal to the threshold, the weight 0 will be applied, and the weight may increase in proportion to the increasing magnitude. This process may be indicated as Equation 3 as shown above.

Thereafter, the processor 120 may obtain the output image by multiplying the generated shadow S by the obtained boundary information (B). For example, the processor 120 may obtain the output image by multiplying each pixel data included in the shadow map with each pixel data at a corresponding position in the boundary map. In this case, the shadow S is not applied to the region where the boundary information (B) is 0, and the shadow S is applied to the region where the boundary information (B) is 0 or more. Consequently, the shadow is applied to the boundary region according to an embodiment.

In FIG. 9, the boundary B may be a mask which selects the shadow (shown as a multiplication operator). The insertion of the shadow is shown by an addition operation. These are exemplary non-limiting examples of operators.

Figure 10:
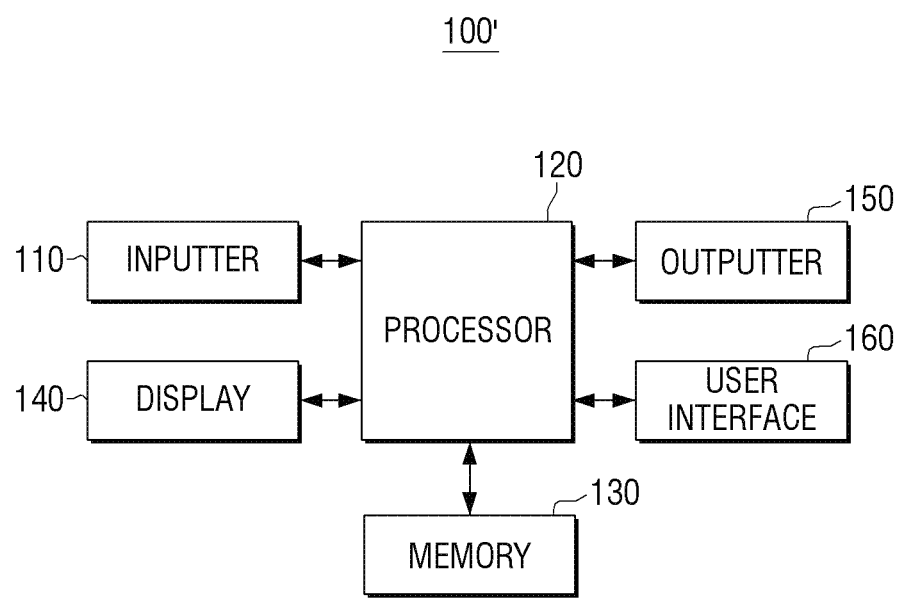
FIG. 10 is a view illustrating an example of implementation of an image processing apparatus according to another embodiment.

FIG. 10 is a view illustrating an example of implementation of an image processing apparatus according to another embodiment.

Referring to FIG. 10, an image processing apparatus 100' includes the inputter 110, the processor 120, a memory 130, a display 140, an outputter 150, and a user interface 160. From among the configurations of FIG. 10, the configurations overlapping with FIG. 2 will not be further described.

The memory 130 is electrically connected to the processor 120 and may store data necessary for various embodiments. In this case, the memory 130 may be implemented as a memory embedded in an image processing apparatus 100', or may be implemented as a detachable memory in the image processing apparatus 100', according to the data usage purpose. For example, data for driving the image processing apparatus 100' may be stored in a memory embedded in the image processing apparatus 100', and data for an additional function of the image processing apparatus 100' may be stored in the memory detachable to the image processing apparatus 100. A memory embedded in the image processing apparatus 100' may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD). In the case of a memory detachably mounted to the image processing apparatus 100', the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like.

Accordingly an embodiment, the memory 130 may store an image received from an external device (for example, a source device), an external storage medium (for example, US), and an external server (for example, web hard), or the like. Here, the image may be a digital moving image but is not limited thereto.

According to an embodiment, the memory 130 may be implemented as a single memory for storing the data generated from various operations of the disclosure.

According to another embodiment, the memory 130 may be implemented to include the first to third memories.

The first memory may store at least a part of the images inputted through the inputter 110. In particular, the first memory may store at least a part of a region of the input image frames. In this case, at least a part of the region may be a region necessary for performing image processing according to an embodiment. According to one embodiment, the first memory may be implemented as an N line memory. For example, the N line memory may be a memory having a capacity equivalent to 17 lines in the vertical direction, but is not limited thereto. For example, when a full HD image of 1080p (resolution of 1,920×1,080) is inputted, only an image region of 17 lines in a full HD image is stored in the first memory. The reason why the first memory is implemented as an N line memory and only a part of the input image frames are stored for image processing is that the memory capacity of the first memory is limited according to hardware limitations.

The second memory is a memory for storing shadow images, boundary information, and the like, and may be implemented in various sizes of memory according to various embodiments. For example, when a shadow image generated according to an embodiment is stored, the memory may be implemented in a size suitable for storing the shadow image.

The third memory is a memory for storing the image-processed (for example, shadow insertion processing) output image and may be implemented in various sizes of memory according to various embodiments. The third memory may be implemented with a size equal to or greater than the size of the input image. According to another embodiment, when an image is outputted in units of images corresponding to the size of the first memory, or in units of pixel lines, it may be implemented in an appropriate size for storing the image. However, if the output image is overwritten in the first memory or the second memory, or the output image is displayed without being stored, the third memory may not be necessary.

The display 140 may be implemented as a display including a self-emitting element or a display including a non-self-limiting element and a backlight. For example, the display 140 may be implemented as a display of various types such as a liquid crystal display (LCD), organic light emitting diodes (OLED) display, light emitting diodes (LED), plasma display panel (PDP), quantum dot light-emitting diodes (QLED), or the like. In the display 160, a backlight unit, a driving circuit which may be implemented as an a-si TFT, low temperature poly silicon (LTPS) TFT, organic TFT (OTFT), or the like, may be included as well. In the meantime, the display 140 may be implemented as a touch screen coupled to a touch sensor, a flexible display, a rollable display, a third-dimensional (3D) display, a display in which a plurality of display modules are physically connected, or the like. The processor 120 may control the display 140 to output an output image that is processed according to various embodiments.

The outputter 150 outputs a sound signal. For example, the output unit 150 may convert the digital sound signal processed by the processor 120 into an analog sound signal, amplify and output the analog sound signal. For example, the outputter 150 may include at least one speaker unit, a D/A converter, an audio amplifier, or the like, capable of outputting at least one channel. According to an example, the outputter 150 may be implemented to output various multi-channel sound signals. In this case, the processor 120 may control the outputter 150 to process the input sound signal in accordance with the enhanced processing of the input image. For example, the processor 120 may convert an input two-channel sound signal into a virtual multi-channel (for example, 5.1 channel) sound signal, recognize a position where the image processing apparatus 100' is located to process the signal as a cubic sound signal optimized to a space, or provide an optimized sound signal according to the type of input image (for example, a content genre).

The user interface 160 may be implemented as a device such as a button, a touch pad, a mouse, and a keyboard, or a touch screen or a remote control transceiver capable of performing the above-described display function and operation input function. The remote control transceiver may receive a remote control signal from an external remote controller through at least one communication methods such as an infrared rays communication, Bluetooth communication, or Wi-Fi communication, or transmit the remote control signal. According to an embodiment, the shadow inserting process according to an embodiment may be selected through the user setting menu, and in this case, the user command for inserting the shadow through the remote transceiver may be received.

The image processing apparatus 100 may further include a tuner and a demodulator according to an embodiment. A tuner (not shown) may receive a radio frequency (RF) broadcast signal by tuning a channel selected by a user or all pre-stored channels among RF broadcast signals received through an antenna. The demodulator (not shown) may receive and demodulate the digital intermediate frequency (IF) signal and digital IF (DIF) signal converted by the tuner, and perform channel decoding, or the like. The input image received via the tuner according to one embodiment may be processed via the demodulator (not shown) and then provided to the processor 120 for shadow processing according to one embodiment.

Figure 11:
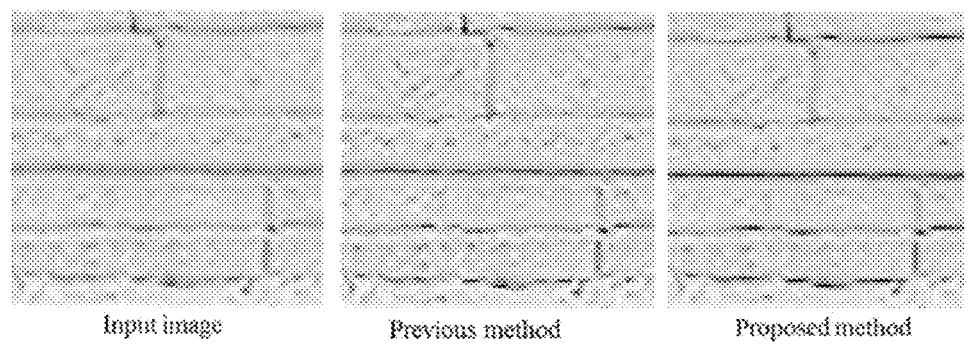
FIG. 11 is a view provided to describe a shadow insertion effect according to an embodiment.

FIG. 11 is a view provided to describe a shadow insertion effect according to an embodiment. FIG. 11 illustrates a previous method in which the input image is processed using a previous method, and a proposed method in which the input image is processed according to an embodiment respectively, when an image which photographs a wall constituting bricks.

Referring to FIG. 11, thin edges on a surface of bricks are present in the input image, in addition to the thick edges between bricks. According to the conventional art, by simultaneously amplifying the frequency signal corresponding to the thick edge and the thin edge, the noise may be increased along with the sharpness improvement. In the meantime, according to the embodiment, by inserting the shadow for the thick edge, it may be confirmed that the noise is less amplified, and the detail enhancement effect is excellent, compared with the conventional art.

FIGS. 12A to 12D are views provided to describe a method for determining whether to apply boundary enhancement as provided in various embodiments.

Figure 12A:
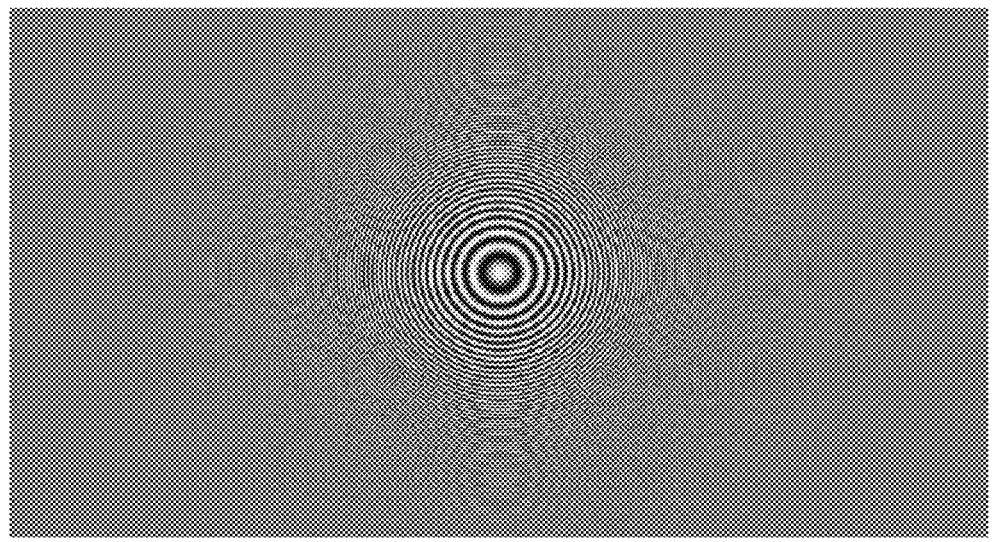
FIG. 12A is a view provided to describe a method for determining whether to apply boundary enhancement as provided in various embodiments.

FIG. 12A illustrates an example of the input image. As shown in FIG. 12A, the input image may be a pattern image that changes from a thick circular pattern to a fine circular pattern from the center toward an edge. For example, the center circle may be a thick edge with thickness of tens of pixels, and the outermost circle may be a thin edge with thickness of one pixel.

Figure 12B:
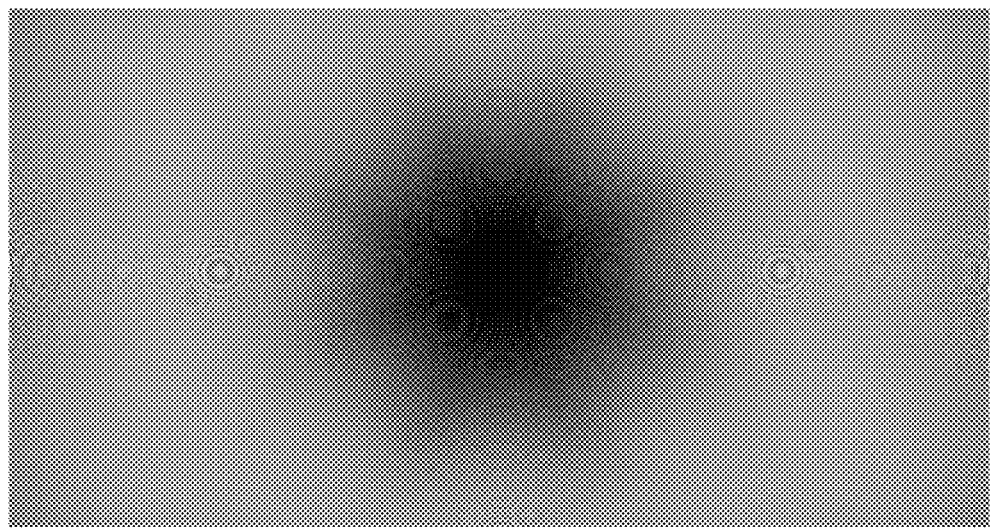
FIG. 12B is a view provided to describe a method for determining whether to apply boundary enhancement as provided in various embodiments.

FIG. 12B illustrates an image of detecting edges having a thickness less than the first threshold from among the edges included in the input image. For example, the processor 120 may detect the edges having thickness less than the first threshold using the Laplacian filter having the first size.

Figure 12C:
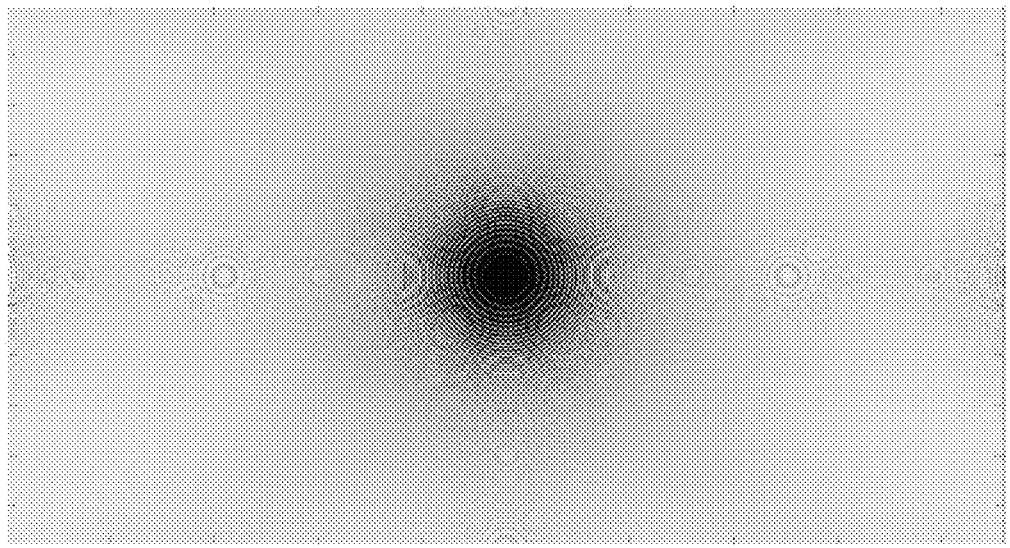
FIG. 12C is a view provided to describe a method for determining whether to apply boundary enhancement as provided in various embodiments.

FIG. 12C illustrates an image for detecting edges having a thickness less than the second threshold among the edges included in the input image. Here, the second threshold may be a value larger than the first threshold. For example, the processor 120 may detect edges having a thickness less than the second threshold using a Laplacian filter of a second size that is smaller than the first size.

Figure 12D:
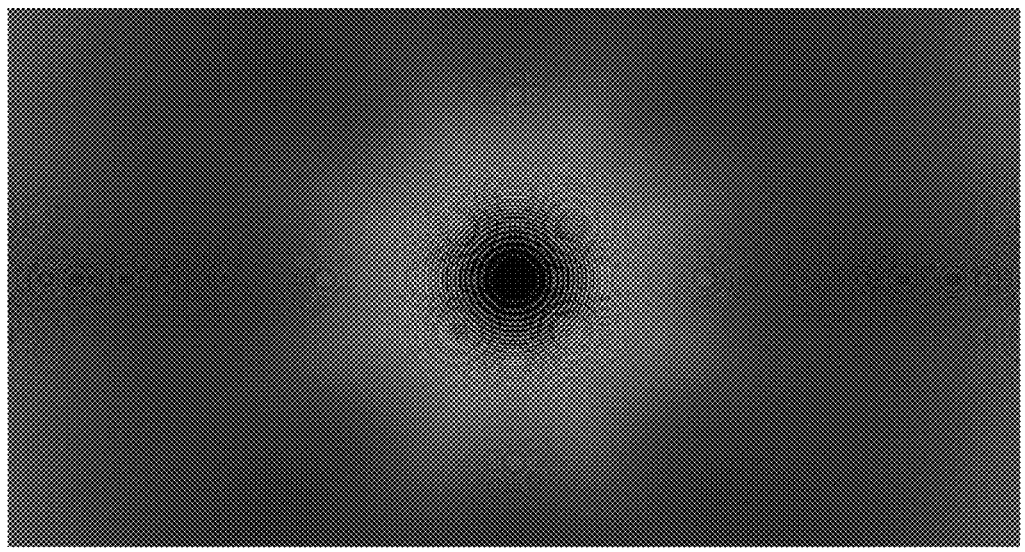
FIG. 12D is a view provided to describe a method for determining whether to apply boundary enhancement as provided in various embodiments.

FIG. 12D illustrates an image for detecting edges having a thickness which is greater than or equal to the first threshold and less than the second threshold among the edges included in the input image. For example, the processor 120 may detect edges having a thickness which is greater than or equal to the first threshold and less than the second threshold using the Laplacian filter of a third size greater than the second size and less than the first size.

According to another embodiment, after detecting the edges using a fixed size filter (for example, FIG. 6A), it is possible to detect the edges of different magnitudes by adjusting the threshold of Equation 3.

According to the images shown in FIGS. 12B to 12D, it is confirmed that a discontinuous area (dark area) is formed in eight directions in the central area of an image. This means that the edge is detected using eight filters having different directions (for example, FIG. 6A). That is, when the output image for the input image shown in FIG. 12A has a shape as shown in FIGS. 12B to 12D, it may be seen that one of the embodiments is used.

Figure 13:
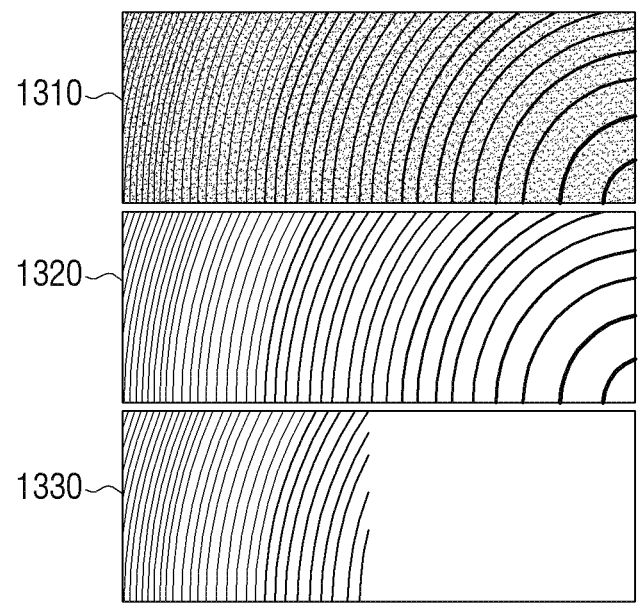
FIG. 13 is a view provided to describe a method for determining whether to apply boundary enhancement as provided in various embodiments.

FIG. 13 is a view provided to describe a method for determining whether to apply boundary enhancement as provided in various embodiments.

FIG. 13 illustrates an input image 1310, an output image 1320, and a difference image 1330 in order. The difference image refers to an image representing a difference between pixel values by comparing the input image and the output image. Referring to the difference image 1330 which is obtained by comparing the input image 1310 and the output image 1320, negative values are included in the dark edge position. This means that the shadow is inserted to the boundary (for example, the inner boundary of the dark object) of the object, and it is seen that one of the embodiments is used.

Figure 14:
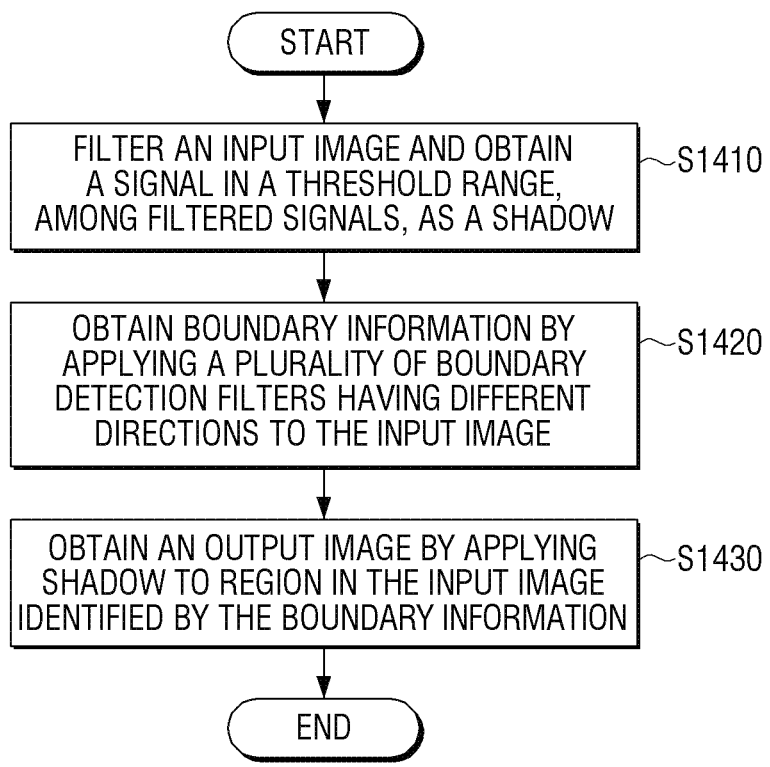
FIG. 14 is a flowchart provided to describe a method for image processing according to an embodiment.

FIG. 14 is a flowchart provided to describe a method for image processing according to an embodiment.

According to the image processing method of FIG. 14, when the input image is received, the input image is filtered, and a signal in a threshold range, from among the filtered signals, is obtained as a shadow in step S1410.

The boundary information is obtained by applying the plurality of boundary detection filters having different directions to the input image in step S1420.

Then, the output image is obtained by applying the shadow to the region which is identified by the boundary information, in the input image in step S1430. Here, the output image may be 4K UHD image or 8K UHD image.

In the step of S1410 to obtain the shadow, the second-order differentiation signal is obtained by filtering the input image with the second-order differentiation filter, and the shadow may be obtained by clipping a positive signal or a negative signal from the second-order differentiation signal.

In this case, the obtained shadow may correspond to at least one of the inner boundary of an object having a pixel value less than the first threshold, from among the objects included in the input image, or the outer boundary of an object having the pixel value which is greater than or equal to the second threshold that is greater than the first threshold, from among the objects included in the input image.

In addition, the boundary information may include positional information and magnitude information of the boundary region. In step S1430 of acquiring the output image, the boundary region may be identified based on the positional information, the magnitude information corresponding to the identified boundary region may be applied to the shadow corresponding to the identified boundary region, and the shadow to which the magnitude information is applied may be inserted into the identified boundary region.

In the step S1410 of obtaining the shadow, the shadow may be obtained by applying the second-order differentiation filter to the input image. In this case, in the step S1420 to acquire the boundary information, the boundary information may be obtained by applying the plurality of boundary detection filters having a size greater than the second-order differentiation filter to the input image.

Also, in step S1420 of obtaining boundary information, a plurality of filter output values may be obtained by applying the plurality of boundary detection filters to the pixel blocks included in the input image, and the boundary information on the pixel blocks may be obtained based on one of the plurality of filter output values.

In the step S1420 of obtaining the boundary information, the boundary information on the pixel blocks may be obtained based on the magnitude of the smallest negative value or the maximum absolute value from among the plurality of filter output values.

Also, in step S1430 of obtaining the output image, the output image may be obtained through normalization by applying the threshold to at least one of the magnitude of the smallest negative value or the maximum absolute value from among the plurality of filter output values, and by applying the weight obtained by the normalizing to the shadow.

In step S1420 of obtaining the boundary information, at least one of the number or the size of a plurality of boundary detection filters may be determined based on the characteristic of the region to which the shadow will be applied.

When the number of the plurality of boundary detection filters is N, the direction of the $n^{th}$ boundary detection filter may be calculated through the equation $180*(n-1)/N$.

According to the above-described various embodiments, it is possible to accurately detect the boundary of an object in a high-resolution image to apply the shadow. Thus, sharpness of an image may be enhanced by making a contour of an object clear, while avoiding noise amplification within the image.

The various embodiments may be applied to not only image processing apparatuses but also other electronic devices such as an image receiving device such as a set-top box and a display device such as a TV, and the like.

The method according to various embodiments may be implemented as an application which may be installed in the conventional image processing apparatus. Alternatively, the methods according to various embodiments may be performed using deep learning-based artificial intelligence neural network (or in-depth artificial neural network), that is, the learning network model.

In addition, the methods according to various embodiments may be implemented only with software upgrade or hardware upgrade for the conventional image processing apparatus.

The various embodiments may be performed through an embedded server provided in the image processing apparatus or an external server of the image processing apparatus.

According to an embodiment, the various embodiments as described above may be implemented with software including instructions stored in the machine-readable storage media readable by a machine (e.g., computer). The apparatus may be an apparatus which may call instructions from the storage medium and operates according to the called instructions, and may include an electronic apparatus (e.g., image processing apparatus (A)) in accordance with the disclosed embodiments. When an instruction is executed by a processor, the processor may perform functions corresponding to the instruction, either directly or under the control of the processor, using other components. The instructions may include a code generated or executed by the compiler or interpreter. A machine-readable storage medium may be provided in the form of a non-transitory storage medium. Here, "non-transitory" means that the storage medium does not include a signal and is tangible, but does not distinguish whether data is stored semi-permanently or temporarily on the storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some subelements of the abovementioned subelements may be omitted, The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order.

While the preferred embodiments have been shown and described, the disclosure is not limited to the specific embodiments, and it is to be understood that the disclosure is not limited to the specific embodiments as described above, it will be understood by those of ordinary skill in the art that various changes in form and details may be made therein without departing from the spirit and scope as defined by the following claims and their equivalents.

---

100: IMAGE PROCESSING APPARATUS 110: INPUTTER
120: PROCESSOR

---

What is claimed is:

1. An image processing apparatus comprising:
one or more processors; and
one or more memories storing program code, wherein execution of the program code by the one or more processors is configured to cause the image processing apparatus to:
obtain, based on filtering of an input image using a second-order differentiation filter, a shadow, wherein the shadow is a signal in a threshold range;
obtain boundary information by applying, to the input image, a plurality of boundary detection filters, wherein each boundary detection filter of the plurality of boundary detection filters is associated with a different direction; and
obtain an output image by applying the shadow to a region identified based on the boundary information.

2. The image processing apparatus of claim 1, wherein the one or more processors are further configured to obtain the shadow by clipping a positive signal or a negative signal from the output signal.

3. The image processing apparatus of claim 1, wherein the shadow corresponds to at least one of:
an inner boundary of a first object in the input image, wherein the inner boundary includes a first pixel having a first pixel value that is less than a first threshold, or
an outer boundary of a second object in the input image, wherein the outer boundary includes a second pixel having a second pixel value that is greater than or equal to a second threshold, wherein the second threshold is greater than the first threshold.

4. The image processing apparatus of claim 1,
wherein the boundary information comprises position information and magnitude information,
wherein the one or more processors are further configured to identify the boundary region based on the position information, and
wherein the one or more processors are further configured to obtain the output image by:
applying magnitude information corresponding to the boundary region to the shadow, and
inserting the shadow to which the magnitude information is applied into the boundary region.

5. The image processing apparatus of claim 1,
wherein the one or more processors are further configured to filter with a second-order differentiation filter, and
wherein a first size of each of the plurality of boundary detection filters is greater than a second size of the second-order differentiation filter.

6. The image processing apparatus of claim 1,
wherein the input image includes a first pixel block, and
wherein the one or more processors are further configured to:
obtain the boundary information by:
obtaining a first plurality of filter output values by applying the plurality of boundary detection filters to the first pixel block, and
obtaining first boundary information associated with the first pixel block based on a first value of the first plurality of filter output values.

7. The image processing apparatus of claim 6,
wherein the one or more processors are further configured to obtain the boundary information associated with the first pixel block based on:
a magnitude of a smallest negative value of the first plurality of filter output values, or
a maximum absolute value of the first plurality of filter output values.

8. The image processing apparatus of claim 7,
wherein the one or more processors are further configured to:
obtain a weight by performing a normalization by applying a threshold to: i) the magnitude of the smallest negative value or ii) the maximum absolute value, and
obtain the output image by applying the weight to the obtained shadow.

9. The image processing apparatus of claim 1, wherein the one or more processors are further configured to determine, based on a characteristic of the boundary region, at least one of a number or a size of the plurality of boundary detection filters.

10. The image processing apparatus of claim 1, wherein the plurality of boundary detection filters comprises a first filter in which a same filter coefficient is overlapped in a line unit in a first direction, a second filter in which a same filter coefficient is overlapped in a line unit in a second direction, a third filter in which a same filter coefficient is overlapped in a line unit in a third direction, and a fourth filter in which a same filter coefficient is overlapped in a line unit in a fourth direction.

11. The image processing apparatus of claim 1, wherein, based on a number of the plurality of boundary detection filters being N, a direction of an $n^{th}$ boundary detection filter is calculated through Equation below;

angle of $n^{th}$ boundary detection filter=180*$(n-1)$/N.

12. The image processing apparatus of claim 1, further comprising:
a display,
wherein the one or more processors are further are configured to control the display to output the output image, and
wherein the output image is a 4K ultra high definition (UHD) image or an 8K UHD image.

13. An image processing method of an image processing apparatus, the image processing method comprising:
obtaining, based on filtering of an input image using a second-order differentiation filter, a shadow, wherein the shadow is a signal in a threshold range;
obtaining boundary information by applying, to the input image, a plurality of boundary detection filters, wherein each boundary detection filter of the plurality of boundary detection filters is associated with a different direction; and
obtaining an output image by applying the shadow to a region identified based on the boundary information.

14. The image processing method of claim 13, wherein the obtaining the shadow comprises clipping a positive signal or a negative signal from the output signal.

15. The image processing method of claim 13, wherein the shadow corresponds to at least one of:
an inner boundary of a first object in the input image, wherein the inner boundary includes a first pixel having a first pixel value that is less than a first threshold, or
an outer boundary of a second object in the input image, wherein the outer boundary includes a second pixel having a second pixel value that is greater than or equal to a second threshold, wherein the second threshold is greater than the first threshold.

16. The image processing method of claim 13, wherein the boundary information comprises position information and magnitude information,
wherein the obtaining the output image comprises:
identifying the boundary region based on the position information,
applying magnitude information corresponding to the boundary region to the shadow, and
inserting the shadow to which the magnitude information is applied into the boundary region.

17. The image processing method of claim 13, wherein the obtaining the shadow comprises filtering with a second-order differentiation filter, and
wherein a first size of each of the plurality of boundary detection filters is greater than a second size of the second-order differentiation filter.

18. The image processing method of claim 13, wherein the input image includes a first pixel block, and
wherein the obtaining the boundary information comprises:
obtaining a first plurality of filter output values by applying the plurality of boundary detection filters to the first pixel block, and
obtaining first boundary information associated with the first pixel block based on a first value of the first plurality of filter output values.

19. The image processing method of claim 18, wherein the obtaining the boundary information comprises obtaining boundary information associated with the first pixel block based on:
a magnitude of a smallest negative value of the first plurality of filter output values, or
a maximum absolute value of the first plurality of filter output values.

20. A non-transitory computer-readable recording medium storing computer instructions which allow an image processing apparatus to perform an operation when the computer instructions are executed by one or more processors of the image processing apparatus, the operation comprising:
obtaining, based on filtering of an input image using a second-order differentiation filter, a shadow, wherein the shadow is a signal in a threshold range;
obtaining boundary information by applying, to the input image, a plurality of boundary detection filters, wherein each boundary detection filter of the plurality of boundary detection filters is associated with a different direction; and
obtaining an output image by applying the shadow to a region identified based on the boundary information.

* * * * *